(12) United States Patent
Krah

(10) Patent No.: US 10,156,940 B2
(45) Date of Patent: Dec. 18, 2018

(54) PANEL MISMATCH COMPENSATION FOR TOUCH ENABLED DISPLAYS

(71) Applicant: Apple Inc., Cupertino, CA (US)

(72) Inventor: Christoph Horst Krah, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 59 days.

(21) Appl. No.: 14/205,125

(22) Filed: Mar. 11, 2014

(65) Prior Publication Data
US 2015/0261340 A1  Sep. 17, 2015

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04104* (2013.01)

(58) Field of Classification Search
CPC ....... G06F 3/044; G06F 3/0416; G06F 3/0418
See application file for complete search history.

(56) References Cited

U.S. PATENT DOCUMENTS

| | | | |
|---|---|---|---|
| 5,287,108 A | 2/1994 | Mayes et al. | |
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,643,011 B2 | 1/2010 | O'Connor et al. | |
| 7,663,607 B2 | 2/2010 | Hotelling et al. | |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Lixi C Simpson
(74) *Attorney, Agent, or Firm* — Morrison & Foerster LLP

(57) ABSTRACT

A controller with mismatch compensation for a touch panel is disclosed. A multi-stimulus controller for a touch panel can be formed on a single integrated circuit (single-chip) that can include a transmit section that can generate a plurality of drive signals, a plurality of transmit channels that can transmit the drive signals simultaneously to drive the touch panel, a receive channel that can receive a sense signal resulting from the driving of the touch panel, and a demodulation section that can demodulate the received sense signal to obtain sensing results, the demodulation section including a demodulator and a vector operator. The transmit section can include a pair of adjustable gain buffers that can adjust the gain of stimulation signals to account for the signal path length mismatch of various transmit signal paths.

22 Claims, 13 Drawing Sheets

(56) References Cited

U.S. PATENT DOCUMENTS

| | | |
|---|---|---|
| 7,692,638 B2 | 4/2010 | Land et al. |
| 8,031,094 B2 | 10/2011 | Hotelling et al. |
| 8,035,622 B2 | 10/2011 | Hotelling et al. |
| 8,125,456 B2 | 2/2012 | Krah et al. |
| 8,125,464 B2 | 2/2012 | Land et al. |
| 8,237,667 B2 | 8/2012 | Krah |
| 8,479,122 B2 | 7/2013 | Hotelling et al. |
| 8,487,893 B2 | 7/2013 | Crandall et al. |
| 8,525,532 B2 | 9/2013 | Ningrat |
| 8,592,697 B2 | 11/2013 | Hotelling et al. |
| 8,890,854 B2 | 11/2014 | Tenuta et al. |
| 8,913,021 B2 | 12/2014 | Elias et al. |
| 8,988,384 B2 | 3/2015 | Krah et al. |
| 9,086,768 B2 | 7/2015 | Elias et al. |
| 9,158,393 B2 | 10/2015 | Vlasov |
| 2006/0197753 A1 | 9/2006 | Hotelling |
| 2008/0158175 A1 | 7/2008 | Hotelling et al. |
| 2009/0189867 A1 | 7/2009 | Krah et al. |
| 2010/0060593 A1* | 3/2010 | Krah ..................... G06F 3/0416 345/173 |
| 2011/0061947 A1* | 3/2011 | Krah ..................... G06F 1/3215 178/18.01 |
| 2011/0061948 A1 | 3/2011 | Krah et al. |
| 2012/0050213 A1 | 3/2012 | Bokma |
| 2012/0162089 A1 | 6/2012 | Chang |
| 2012/0268397 A1 | 10/2012 | Lee et al. |
| 2013/0076646 A1 | 3/2013 | Krah et al. |
| 2013/0176275 A1* | 7/2013 | Weaver ................... G06F 3/044 345/174 |
| 2014/0049509 A1* | 2/2014 | Shepelev ................ G06F 3/044 345/174 |
| 2014/0049510 A1 | 2/2014 | Chung et al. |
| 2014/0057681 A1 | 2/2014 | Grivas et al. |
| 2014/0104231 A1 | 4/2014 | Hu |
| 2015/0035787 A1 | 2/2015 | Shahparnia et al. |
| 2015/0116267 A1* | 4/2015 | Inoue .................... G06F 3/0416 345/174 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

PANEL MISMATCH COMPENSATION FOR TOUCH ENABLED DISPLAYS

FIELD OF THE DISCLOSURE

This relates generally to controllers for multi-stimulus sensors, and in particular, to the correction of panel signal path mismatches compensation.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Mutual capacitance touch sensor panels can be formed from a matrix of drive and sense lines of a substantially transparent conductive material such as Indium Tim Oxide (ITO), often arranged in rows and columns in horizontal and vertical directions on a substantially transparent substrate. Drive signals can be transmitted through the drive lines, resulting in signal capacitances at the crossover points (sensing pixels) of the drive lines and the sense lines. The signal capacitances can be determined from sense signals that are generated in the sense lines due to the drive signals. In some touch sensor panel systems, multiple drive lines are stimulated simultaneously to generate composite sense signals in the sense lines. Amplifiers in the sense lines can process the composite sense signals and prepare them for demodulation. Ideally, when no touch is present the charge going into the amplifiers can be substantially zero. This can be achieved by ensuring that the composite signal in a no-touch condition is substantially zero. However, due to varying signal paths that the individual signals of the composite signal travel, the composite signal in a no-touch condition may be non-zero, thus putting the amplifier at risk for saturation and reducing the amount of headroom in the amplifier for ambient and parasitic noise.

SUMMARY OF THE DISCLOSURE

In view of the foregoing, a multi-stimulus controller for a multi-touch sensor can be formed on a single integrated circuit (single-chip) that can include a transmit oscillator, a transmit signal section that can generate a plurality of drive signals based on a frequency of the transmit oscillator, a plurality of transmit channels that can transmit the drive signals simultaneously to drive the multi-touch sensor, a receive channel that can receive a sense signal resulting from the driving of the multi-touch sensor, a receive oscillator, and a demodulation section that can demodulate the received sense signal based on a frequency of the receive oscillator to obtain sensing results, the demodulation section including a demodulator and a vector operator. The transmit signal section can include a pair of adjustable gain buffers that can adjust the gain of stimulation signals to account for the signal path length mismatch of various transmit signal paths.

DETAILED DESCRIPTION OF THE PREFERRED EXAMPLES

In the following description of preferred examples, reference is made to the accompanying drawings which form a part hereof, and in which it is shown by way of illustration specific examples in which the disclosure can be practiced. It is to be understood that other examples can be used and structural changes can be made without departing from the scope of the examples of this disclosure.

This relates to a multi-stimulus controller for a multi-touch sensor that can include a set of adjustable gain buffers to account for mismatch in the transmit signal paths of the multi-stimulus controller. The adjustable gain buffers can be calibrated to provide various degrees of gain based on the stimulation step that is being applied to the drive lines of the controller. The values of gain corresponding to each step can be empirically determined and then applied during operation of the device.

The controller can include a receive section, a multistage vector demodulation engine, a transmit section, and various peripherals, such as memory, logic, interfaces, signal generators, processors, etc. The multi-stimulus controller can drive a sensor, such as a touch sensor panel, using multiple simultaneous drive signals, and can receive sense signals from the sensors that result from the multiple stimuli. The sense signals received by the multi-stimulus controller can be composite signals that can be formed of a superposition of multiple component sense signals, each component signal resulting from a drive signal, and each component signal carrying measurement data. The multi-stimulus controller can demodulate and decode multiple composite signals to extract the individual measurement data carried by the component signals.

Although examples of the disclosure may be described and illustrated herein in terms of mutual capacitance touch sensor panels, it should be understood that examples of this disclosure are not so limited, but can be additionally applicable to self-capacitance sensor panels, and both single and multi-touch sensor panels, and other sensors, in which multiple simultaneous stimulation signals can be used to generate a composite sense signal. Furthermore, although examples of the disclosure may be described and illustrated herein in terms of double-sided ITO (DITO) touch sensor panels, it should be understood that examples of the disclosure can also be applicable to other touch sensor panel configurations, such as configurations in which the drive and sense lines are formed on different substrates or on the back of a cover glass, and configurations in which the drive and sense lines are formed on the same side of a single substrate.

Figure 1:
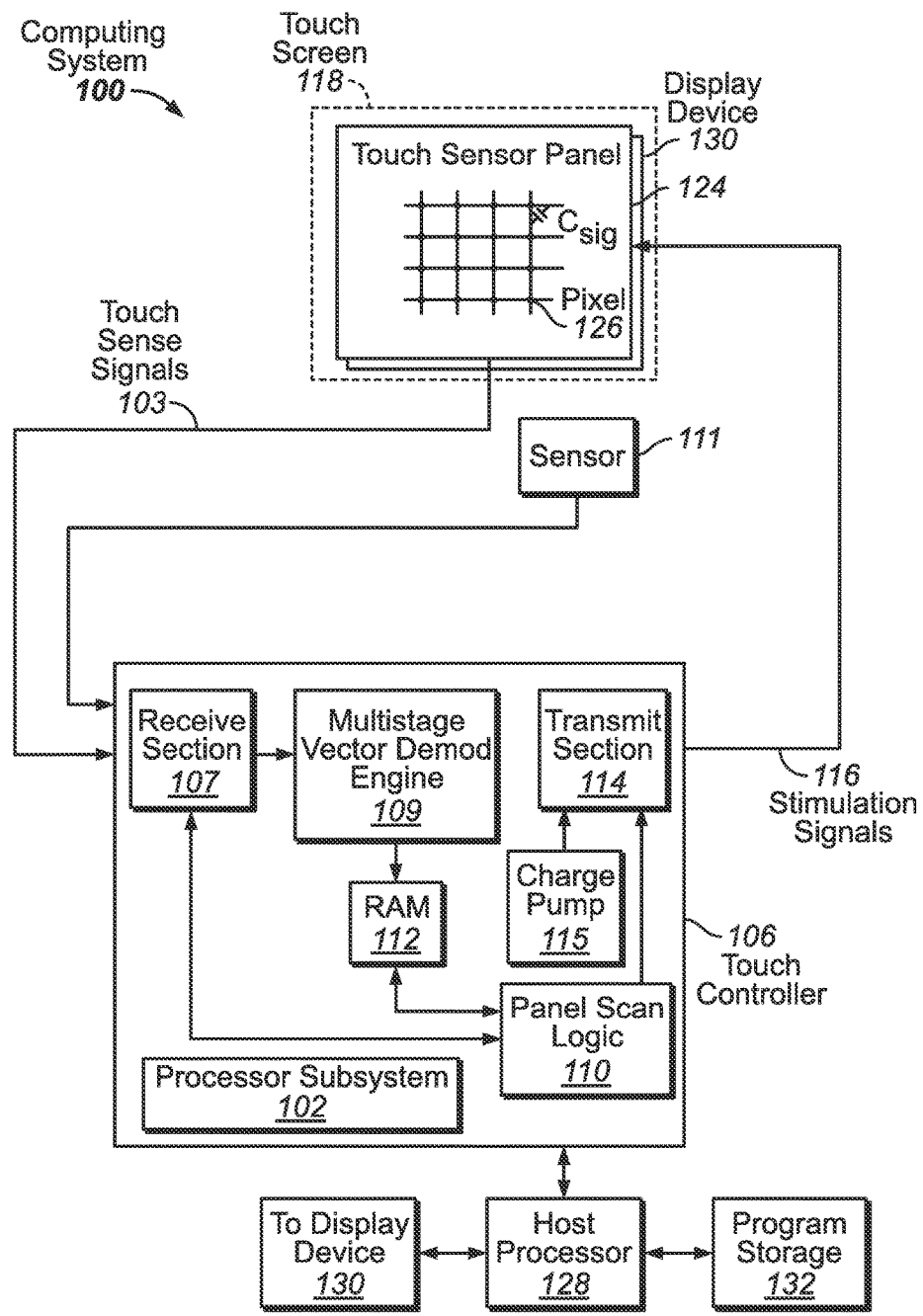
FIG. 1 illustrates an example computing system according to examples of the disclosure.

FIG. 1 illustrates example computing system 100 that utilizes a single-ASIC multi-touch controller 106 with integrated drive system according to examples of the disclosure. Touch controller 106 can be a single application specific integrated circuit (ASIC) that can include one or more processor subsystems 102, which can include, for example, one or more main processors, such as ARM968 processors or other processors with similar functionality and capabilities. However, in other examples, the processor functionality can be implemented instead by dedicated logic, such as a state machine. Processor subsystems 102 can also include, for example, peripherals (not shown) such as random access memory (RAM) or other types of memory or storage, watchdog timers and the like. Touch controller 106 can also include, for example, a receive section 107 for receiving signals, such as touch sense signals 103 of one or more sense channels (not shown), other signals from other sensors such as sensor 111, etc. Touch controller 106 can also include, for example, a demodulation section such as multistage vector demod engine 109, panel scan logic 110, and a drive system including, for example, a transmit section 114. Panel scan logic 110 can access RAM 112, autonomously read data from the sense channels and provide control for the sense channels. In addition, panel scan logic 110 can control transmit section 114 to generate stimulation signals 116 at various frequencies and phases that can be selectively applied to rows of a touch sensor panel 124.

A charge pump 115 can be used to generate the supply voltage for the transmit section. The stimulation signals 116 (Vstim) that can have amplitudes higher than the maximum voltage the ASIC process can tolerate by cascoding transistors. Therefore, the stimulus voltage can be higher (e.g. 6V) than the voltage level a single transistor can handle (e.g. 3.6 V). Although FIG. 1 shows charge pump 115 separate from transmit section 114, the charge pump can be part of the transmit section.

Touch sensor panel 124 can include a capacitive sensing medium having a plurality of row traces (e.g., drive lines) and a plurality of column traces (e.g., sense lines), although other sensing media can also be used. The row and column traces can be formed from a transparent conductive medium such as Indium Tin Oxide (ITO) or Antimony Tin Oxide (ATO), although other transparent and non-transparent materials such as copper can also be used. In some examples, the row and column traces can be perpendicular to each other, although in other examples other non-Cartesian orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as used herein are intended to encompass not only orthogonal grids, but the intersecting traces of other geometric configurations having first and second dimensions (e.g. the concentric and radial lines of a polar-coordinate arrangement). The rows and columns can be formed on, for example, a single side of a substantially transparent substrate separated by a substantially transparent dielectric material, on opposite sides of the substrate, on two separate substrates separated by the dielectric material, etc.

At the "intersections" of the traces, where the traces pass above and below (cross) each other (but do not make direct electrical contact with each other), the traces can essentially form two electrodes (although more than two traces could intersect as well). Each intersection of row and column traces can represent a capacitive sensing node and can be viewed as picture element (pixel) 126, which can be particularly useful when touch sensor panel 124 is viewed as capturing an "image" of touch. (In other words, after touch controller 106 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) The capacitance between row and column electrodes can appear as a stray capacitance when the given row is held at direct current (DC) voltage levels and as a mutual signal capacitance Csig when the given row is stimulated with an alternating current (AC) signal. The presence of a finger or other object near or on the touch sensor panel can be detected by measuring changes to a signal charge Qsig present at the pixels being touched, which can be a function of Csig.

Computing system 100 can also include host processor 128 for receiving outputs from processor subsystems 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as an LCD display for providing a UI to a user of the device. In some examples, host processor 128 can be a separate component from touch controller 106, as shown. In other examples, host processor 128 can be included as part of touch controller 106. In still other examples, the functions of host processor 128 can be performed by processor subsystem 102 and/or distributed among other components of touch controller 106. Display device 130 together with touch sensor panel 124, when located partially or entirely under the touch sensor panel, can form touch screen 118.

Note that one or more of the functions described above can be performed, for example, by firmware stored in memory (e.g., one of the peripherals) and executed by processor subsystem 102, or stored in program storage 132 and executed by host processor 128. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 2A:
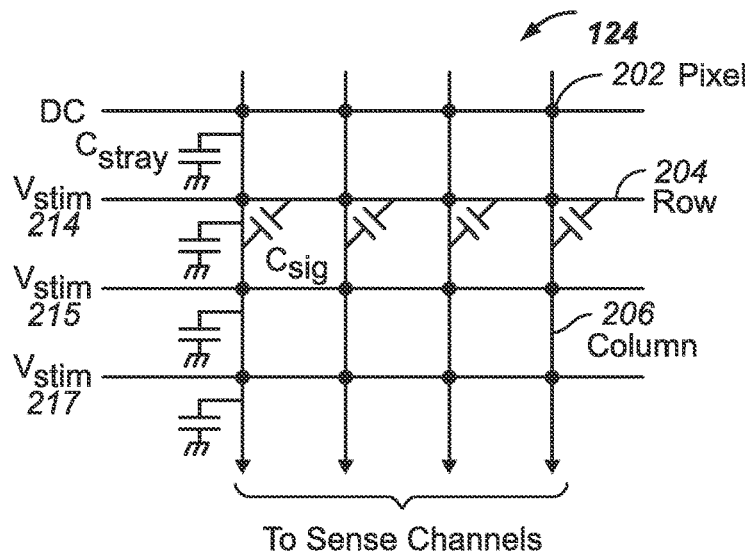
FIG. 2a illustrates an exemplary mutual capacitance touch sensor panel according to one example of this disclosure.

FIG. 2a illustrates a partial view of example touch sensor panel 124 that shows more detail according to examples of the disclosure. FIG. 2a indicates the presence of a stray capacitance Cstray at each pixel 202 located at the intersection of a row 204 and a column 206 trace (although Cstray for only one column is illustrated in FIG. 2a for purposes of simplifying the figure). In the example of FIG. 2a, drive signals transmitted by transmit section 114 can be applied to the rows of touch panel. For example, AC stimulus Vstim 214, Vstim 215 and Vstim 217 can be applied to several rows, while other rows can be connected to DC. Vstim 214, Vstim 215 and Vstim 217 can be, for example, signals having different phases, as will be explained later. Each stimulation signal on a row can cause a charge Qsig to be injected into the columns through the mutual capacitance present at the affected pixels, where:

$$Qsig = Csig \times Vstim \quad (1)$$

A change in the injected charge (Qsig_sense) can be detected when a finger, palm or other object is present at one or more of the affected pixels. Vstim signals 214, 215 and 217 can include one or more bursts of sine waves, square waves, etc. Vstim signals could be comprised of signals with one specific phase, amplitude and frequency but could be composite in nature, e.g. can be comprised of multiple signals, each having a specific phase, amplitude and frequency. Each signal component could be frequency, phase or amplitude modulated. For example, amplitude modulation can be used for windowing purposes to provide a stimulus signal that is narrow band and has little harmonic content as to prevent unwanted noise sources to enter the receive channel. For example, having a stimulus signal with a square wave-shape has higher order harmonics. These higher order harmonics may cause in band noise components due to intermodulation between external noise components with the higher order harmonics of the stimulus. Note that although FIG. 2a illustrates rows 204 and columns 206 as being substantially perpendicular, they need not be so aligned, as described above. Each column 206 can be connected to a sense channel, for example.

Figure 2B:
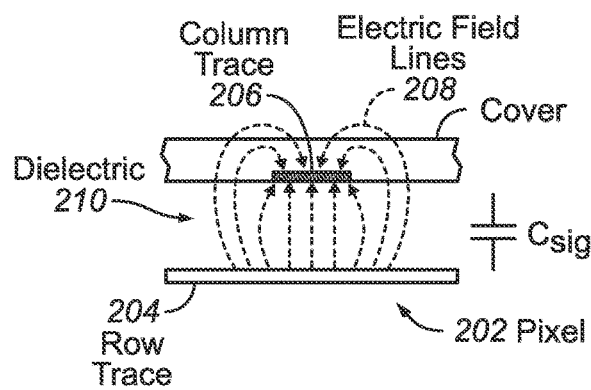
FIG. 2b illustrates a side view of an exemplary pixel in a steady-state (no-touch) condition according to one example of this disclosure.

FIG. 2b illustrates a side view of example pixel 202 in a steady-state (no-touch) condition according to examples of the disclosure. In FIG. 2b, an electric field of electric field lines 208 of the mutual capacitance between column 206 and row 204 traces or electrodes separated by dielectric 210 is shown.

Figure 2C:
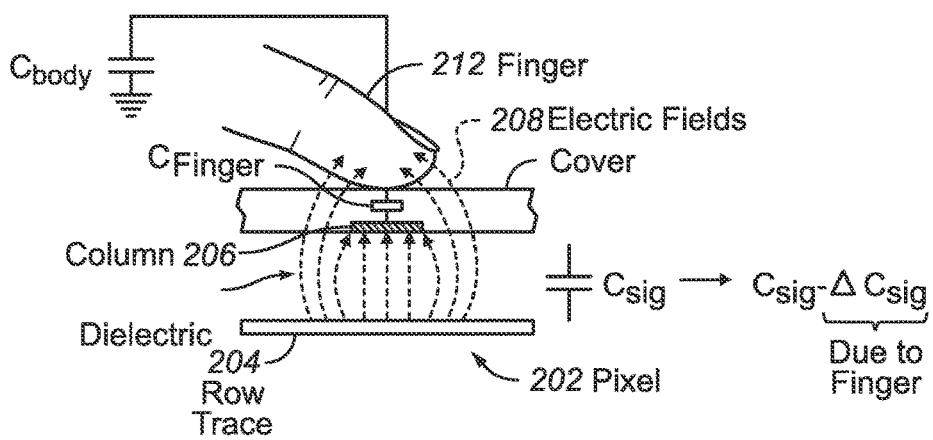
FIG. 2c illustrates a side view of an exemplary pixel in a dynamic (touch) condition according to one example of this disclosure.

FIG. 2c illustrates a side view of example pixel 202 in a dynamic (touch) condition. In FIG. 2c, finger 212 has been placed near pixel 202. Finger 212 can be a low-impedance object at signal frequencies, and has an AC capacitance Cfinger from the column trace 206 to the body. The body has a self-capacitance to ground Cbody of about 200 pF, where Cbody can be much larger than Cfinger. If finger 212 blocks some electric field lines 208 between the row and column electrodes (those fringing fields that exit the dielectric and pass through the air above the row electrode), those electric field lines can be shunted to ground through the capacitance path inherent in the finger and the body, and as a result, the steady state signal capacitance Csig can be reduced by ΔCsig. In other words, the combined body and finger capacitance act to reduce Csig by an amount ΔCsig (which can also be referred to herein as Csig_sense), and can act as a shunt or dynamic return path to ground, blocking some of the electric fields as resulting in a reduced net signal capacitance. The signal capacitance at the pixel becomes Csig−ΔCsig, where Csig represents the static (no touch) component and ΔCsig represents the dynamic (touch) component. Note that Csig−ΔCsig may always be nonzero due to the inability of a finger, palm or other object to block all electric fields, especially those electric fields that remain entirely within the dielectric material. In addition, it should be understood that as a finger is pushed harder or more completely onto the multi-touch panel, the finger can tend to flatten, blocking more and more of the electric fields, and thus ΔCsig can be variable and representative of how completely the finger is pushing down on the panel (e.g., a range from "no-touch" to "full-touch").

Figure 3:
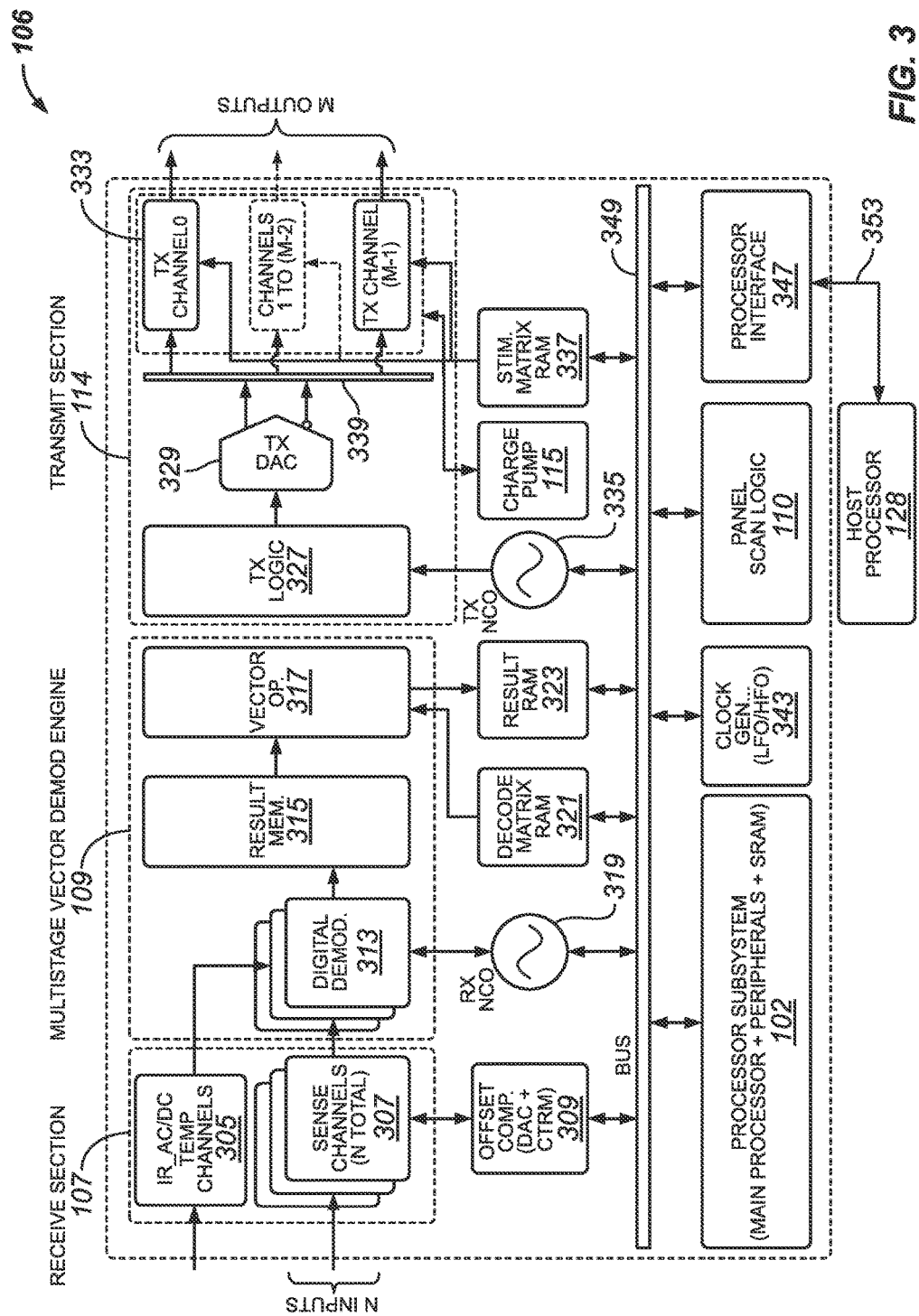
FIG. 3 illustrates an example application specific integrated circuit (ASIC) single chip multi-touch controller according to examples of the disclosure.

FIG. 3 illustrates a more detailed block diagram of example single-ASIC multi-touch controller 106 according to examples of the disclosure. Receive (RX) section 107 of touch controller 106 includes miscellaneous channels 305 (e.g., channels for infrared sensors, temperature sensors, etc.) and a total of N receive channels, such as sense channels 307. Sense channels 307 can be connected to an offset compensator 309. Multistage vector demodulation engine 109 includes a digital demodulation section 313, a result memory 315, and a vector operator 317. Digital demodulation section 313 can be connected to a receive NCO 319, and vector operator 317 can be connected to a decode matrix RAM 321 and connected to a result RAM 323. Transmit (TX) section 114 includes a transmit logic 327, a transmit DAC 329, and a total of M transmit channels 333. Transmit NCO 335 provides a clock to transmit logic and TX DAC and charge pump 115 provides power to the transmit channels. Transmit channels 333 can be connected to a stimulation matrix RAM 337 via an analog bus 339. Decode matrix RAM 321, result RAM 323, and stimulation matrix RAM 337 could be, for example, part of RAM 112. Processor subsystem 102 can store and update, for example, a decode matrix in decode matrix RAM 321 and a stimulation matrix in stimulation matrix RAM 337, initialize the multi-touch subsystem, process data from the receive channels and facilitate communications with the host processor.

FIG. 3 shows processor subsystem 102, panel scan logic 110, and host processor 128. FIG. 3 also shows a clock generator 343 and a processor interface 347. Various components of touch controller 106 can be connected together via a peripheral bus 349. Processor interface 347 can be connected to host processor 128 via a processor interface (PI) connection 353.

Figure 4:
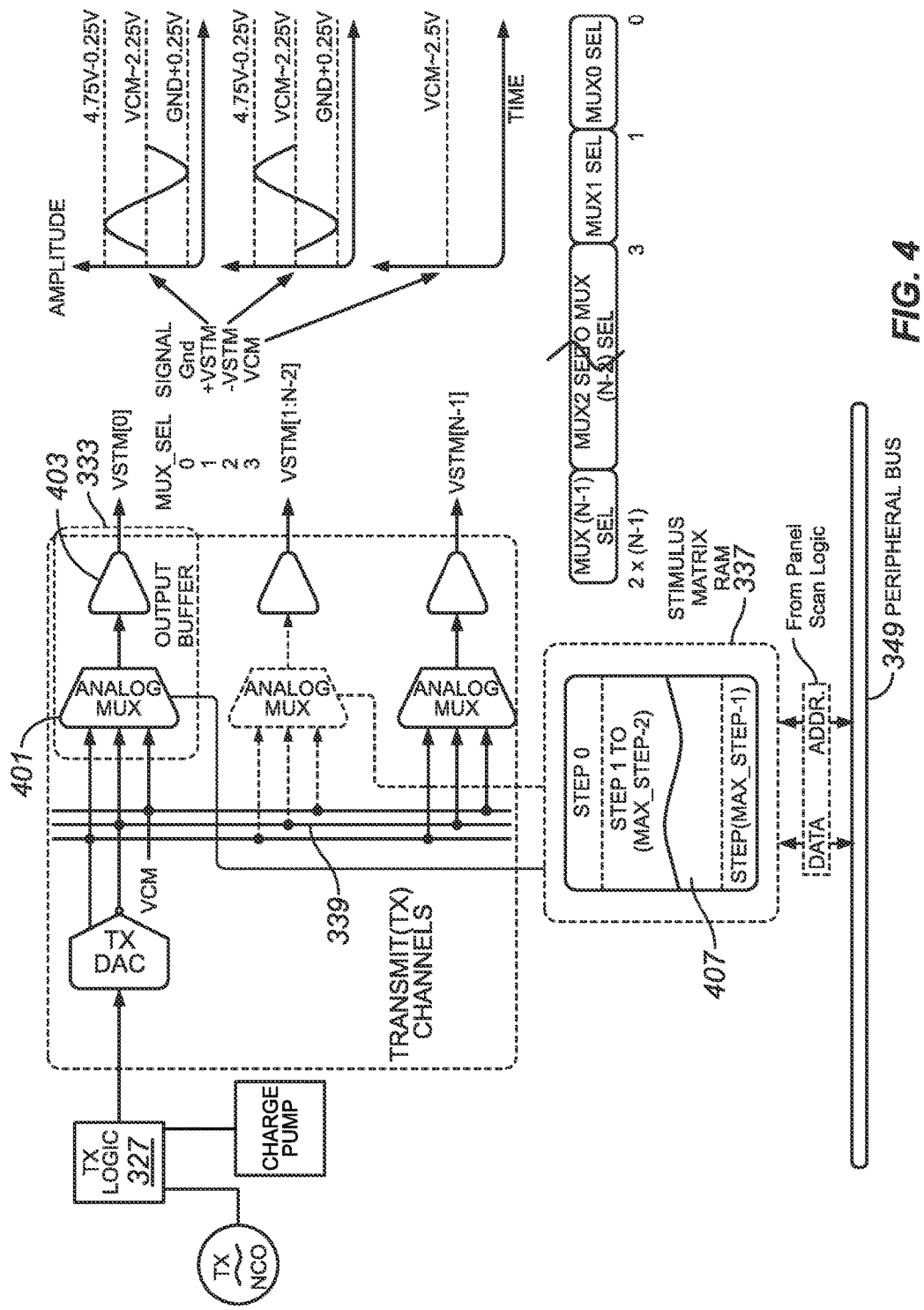
FIG. 4 illustrates an example transmit channel according to examples of the disclosure.

An example drive signal transmission operation of touch controller 106 according to examples of the disclosure will now be described with reference to FIG. 4, which is a block diagram showing more details of touch controller 106. Transmit logic 327, which can be powered by charge pump 115, generates digital signals based on TX NCO 335. TX DAC 329 can be a differential DAC and converts the digital signals from transmit logic 327 into stimulation signals Vstim+ and Vstim−. Vstim+ can be a signal having a waveform at the same frequency as TX NCO 335, and Vstim− can be a signal with the waveform of Vstim+ that can be inverted about a common voltage Vcm. In this example, the common voltage, Vcm, can be equal to 2.5 V. Vstim+ can be a sine wave of frequency ω having a DC offset of 2.5 V and a maximum amplitude of 4.75 V:

$$Vstim+=2.5V+2.25V^*\sin(\omega t)$$

Vstim− a sine wave of frequency ω with a DC offset of 2.25 V and a maximum amplitude of 4.75 V, that can be out of phase with Vstim+ by 180 degrees:

$$Vstim-=2.5 V+2.25V^*\sin(\omega t+180°)$$

Of course, other stimulation signals and signal generation methods could be used. For example, TX NCO 335 could include a mixer to mix the sine wave Vstim+ and Vstim− signals above with an envelope waveform generated from an envelope look-up-table (LUT). The envelope shaping/windowing capability can be beneficial in that it allows the controller to control the spectral properties of the stimulus waveform and also how much energy can be put into the multi-touch panel. Both of these properties control the amount of interference rejection. The more energy is put into the panel the better the interference rejection toward external interferers. Examples of windowing functions are Gaussian, Chebychev or Rectangular. Using, for example, a Chebychev window vs. Rectangular window results in a stimulus waveform that, in the frequency domain, has reduced sideband ripple and therefore allows less noise to enter the receive channel post demodulation.

TX DAC 329 supplies Vstim+ and Vstim− to separate lines of analog bus 339. Bus 339 also includes a line carrying the common voltage, Vcm, and a line that can be grounded, gnd. Each transmit channel 333 includes an analog MUX 401 and buffer 403. Analog MUX 401 can be connected to each line of bus 339, and can select one of the drive signals, Vstim+, Vstim−, Vcm, or gnd to supply to buffer 403. The use of a single TX DAC 329 together with analog bus 339 and multiple MUXs 401 (one for each transmit channel) can allow for a reduced footprint on chip versus other designs, while allowing stimulation signals of different phases to be generated. However, more than one TX DAC 329 could be used. TX DAC 329 can be, for example, an R2-R DAC, a thermometer coded DAC, a sigma-delta DAC, or other type of DAC. MUX 401 selects a drive signal based on a stimulation matrix 407 stored in stimulation matrix RAM 337, as described in more detail below. The buffers 403 of the transmit channels 333 may have a gain of 1 (unity) or a gain higher than 1 dependent on the maximum stimulus voltage level at the output of the TX DAC. Therefore, the buffers may serve the purpose of not only gaining up the signal from the TX DAC but also to provide the drive capability to drive the mostly capacitive load presented to them by the multi-touch sensor panel 124.

Output buffer 403 can provide the benefit of preventing the noise present on the charge pump supply to propagate to the VSTM outputs. This can be important as to prevent any unwanted noise on the VSTM ports generated by the charge-pump to reduce the signal-to-noise ratio and inadvertently to affect the touch-performance. In other words, buffers 403 can be essentially self-regulating because each has negative feedback. The power supply ripple rejection of the output buffers 403 can suffice to suppress any power supply ripple present on the charge pump supply. In some examples, using buffer 403 in transmit section 114 may provide enough power supply ripple rejection to allow the use of an unregulated charge pump. This can allow the design of the charge pump to be simpler and more efficient. Furthermore the charge-pump operating frequency can selected either as a function of the stimulus frequency or outside the stimulus frequency range to prevent charge-pump introduced noise to affect the touch performance.

During each step of a multi-step scan of touch sensor panel 124, each MUX 401 selects one of Vstim+, Vstim−, Vcm, or GND for transmission to a corresponding drive line of the touch sensor panel sensor. GND can be used to put the corresponding output buffer into a low power state to conserve power if that buffer is not used. The selection can be made based on stim matrix 407. As shown in FIG. 4, each row of stim matrix 407 correspond to one step in the scan, and the data values in a row specify the selections of drive signals for each TX channel 333. For each step in the scan, the MUXs 401 select drive signals based on the data values in a row of stim matrix 407. For example, in the first step, the STEP 0 row in FIG. 4 specifies a signal selection for the MUX 401 of the first TX channel (MUX0_SEL), a selection for the MUX 401 of the second TX channel (MUX1_SEL), etc. At each step, the MUXs can select different signal combinations to stimulate the panel differently than in other steps. Panel scan logic 110 can control the timing of the steps by incrementing a step address stored in stimulation matrix RAM 337 through a connection via peripheral bus 349. Once the MUXs select the signals, the signals can be sent to buffers 403 of the TX channel 405 to be transmitted to the panel sensor. It is noted that panel scan logic can also modify stim matrix 407 through peripheral bus 349, for example, to adjust the data entry values of the stim matrix, to replace the stim matrix with another stim matrix, etc.

Figure 5:
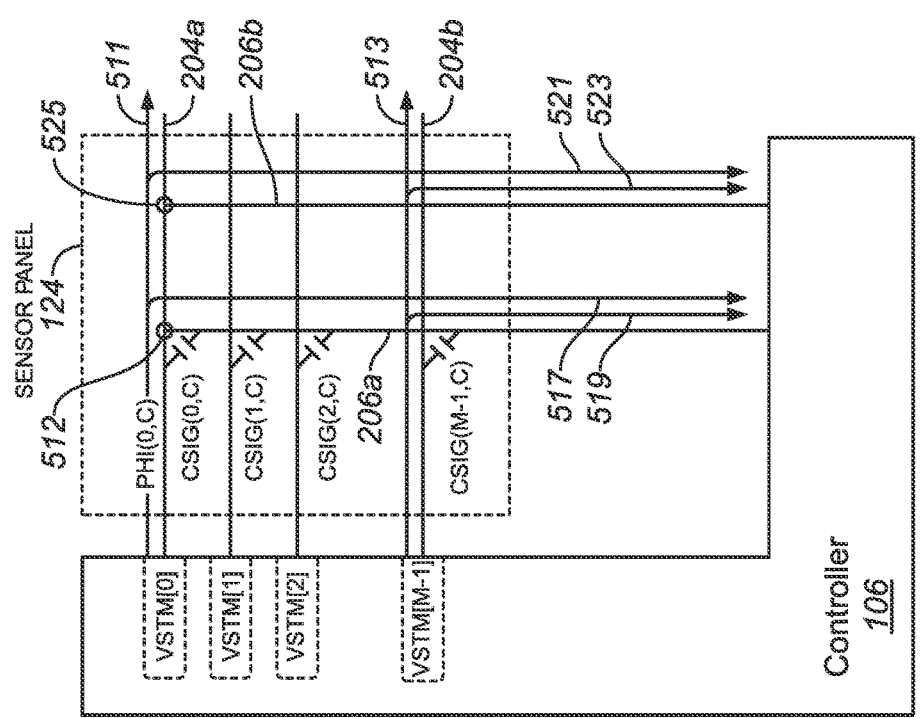
FIG. 5 illustrates an example stimulation of touch sensor panel according to examples of the disclosure.

FIG. 5 illustrates an example stimulation of touch sensor panel 124 according to examples of the disclosure. In particular, FIG. 5 illustrates signal paths of drive signals through rows 204 and sense signals through columns 206 of touch sensor panel 124. FIG. 5 shows touch controller 106 driving and sensor panel 124 during one step of a scan of the sensor panel. In FIG. 5, touch controller 106 is shown having M transmit channels 333 and N sense channels 501, which correspond to M drive lines (rows) 204 and N sense lines (columns), respectively, of sensor panel 124. Transmit channels 333 transmit drive signals Vstim[0], Vstim[1], Vstim[M−1] through drive lines 204. Sense signals SenseSig[0], SenseSig[1], SenseSig[N−1] can be generated as a result of signal charges Qsig injected into the sense lines 206 of each pixel driven with Vstim, in proportion to the signal capacitances Csig of the pixels, as described above. Assuming a linear system, the total signal charge Qsig_tot injected into a sense line 206 can be the sum of the signal charges injected at each pixel of the sense channel C:

$$\text{Qsig\_tot}_C = \text{Qsig}_C(0) + \text{Qsig}_C(1) + \ldots + \text{Qsig}_C(M-1) \quad (2)$$

where $\text{Qsig}_C(R)$ can be the injected charge at the pixel corresponding to drive line R of sense channel C. Thus, referring to equation (1) above:

$$\text{Qsig\_tot}_C = \text{Vstim}(0) \times \text{Csig}_C(0) + \text{Vstim}(1) \times \text{Csig}_C(1) +$$

$$\text{Vstim}(M-1) \times \text{Csig}_C(M-1) \quad (3)$$

At each step in a scan of sensor panel 124, a $\text{Qsig\_tot}_C$ can be generated in each sense channel when drive lines 204 can be driven with particular drive signals based on the MUX_SEL values in stim matrix 407 for that step. A complete scan of sensor panel 124 results in a plurality of $\text{Qsig\_tot}_C$ measurements, i.e., one $\text{Qsig\_tot}_C$ per channel per step. For a scan having P steps, equation (3) can be written as a series of equations, one equation for each step in the scan of sense channel C:

$$\text{Qsig\_tot}_C(S) = \text{Vstim} \times \cos(Pz\_\text{stim}_C(0,S)) \times \text{Csig}_C(0) + \text{Vstim} \times \cos(Pz\_\text{stim}_C(1,S)) \times \text{Csig}_C(1) + \text{Vstim} \times \cos (Pz\_\text{stim}_C((M-1),S)) \times \text{Csig}_C(M-1) \quad (4)$$

where: S=step index (from 0 to P−1)

C = channel index (from 0 to N-1)

$\text{Qsig\_tot}_C(S)$ = Qsig_tot for sense channel C at step S $$Pz\_\text{stim}_C(R, S) = \begin{cases} 0° \stackrel{if}{\rightarrow} Vstim(R, S) = Vstim+ \\ 180° \stackrel{if}{\rightarrow} Vstim(R, S) = Vstim- \end{cases}$$

= stimulation phase of $Vstim(R, S)$ for sense channel C $\text{Csig}_C(R)$ = signal capacitance at the pixel corresponding to drive line R of sense channel C Equation (4) can be written in matrix form as:

$$\begin{bmatrix} \text{Qsig\_tot}_C(0) \\ \text{Qsig\_tot}_C(1) \\ \text{Qsig\_tot}_C(2) \\ \vdots \\ \text{Qsig\_tot}_C(P-1) \end{bmatrix} = Vstim \times \begin{bmatrix} M_C(0,0) & M_C(1,0) & \ldots & M_C(M-1,0) \\ M_C(0,1) & M_C(1,1) & & \\ M_C(0,2) & M_C(1,2) & & \\ \vdots & & \ldots & \\ & & & \ldots \\ M_C(0,P-1) & M_C(1,P-1) & & M_C(M-1,P-1) \end{bmatrix} \times \begin{bmatrix} \text{Csig}_C(0) \\ \text{Csig}_C(1) \\ \text{Csig}_C(2) \\ \vdots \\ \text{Csig}_C(M-1) \end{bmatrix}$$

where: $M_C(R, S) = \cos(Pz\_\text{stim}_C(R, S))$ or, in simplified form:

$$\tilde{Q}\text{sig\_tot}_C = Vstim \times \tilde{M}_C \times \tilde{C}\text{sig}_C \quad (5)$$

where: $\tilde{M}_C$=the phase matrix for sense channel C

The $Vstim \times \tilde{M}_C$ portion of equation (5) represents the selection of drive signals in stim matrix 407 in view of the particular processing methodology of the system. In particular, the entries in the phase matrix $\tilde{M}_C$ are the cosine values of the phases of the stimulation signals)(cos(0° for Vstim+ and)cos(180° for Vstim−). This representation accounts for the particular demodulation process used in the present example, which is described in more detail below with reference to FIG. 6. Although different sense channels have the same phase matrix in this example, in other examples, the phase matrix may vary from sense channel to sense channel.

Thus, by stimulating the pixels of a channel with different combinations of Vstim signals, each combination of Vstim signals defined by a row in stim matrix 407, and obtaining the total signal charges $\text{Qsig\_tot}_C$ from the sense signals resulting from the different stimulation combinations, for example, the signal capacitance $\text{Csig}_C$ at each pixel of the channel may be determined:

$$\tilde{C}\text{sig}_C = \frac{\tilde{M}_C^{-1}}{Vstim} \times \tilde{Q}\text{sig\_tot}_C \quad (6)$$

where:

$\frac{\tilde{M}_C^{-1}}{Vstim}$ = the decode matrix

However, while the stimulation matrix (and by extension, Vstim×M̃$_C$) represents the drive signals that can be selected for each drive line for each step in a scan, the stimulation matrix might not reflect how the system is actually being stimulated once the drive signals are selected. In other words, the stimulation matrix may not capture other factors in the stimulation of pixels and the measurement of sense signals that may depend on the configuration and operation of the system. One example factor not taken into account by the stimulation matrix can be variation in signal delay. FIG. 5, for example, illustrates that both the drive signals and the sense signals can have different signal path lengths in this particular example.

For the sake of clarity, FIG. 5 shows only drive signals 511 (Vstim[0]) and 513 (Vstim[M−1]), corresponding to drive lines 204a and 204b (the first and the last drive lines), and the resulting component signals 517 and 519 of sense signal SenseSig[0] generated on a sense line 206a and component signals 521 and 523 of sense signal SenseSig[1] generated on sense line 206b (the first and second sense lines). FIG. 5 illustrates that each sense signal can be a composite signal formed by the superposition of multiple component signals generated at the sense line's pixels.

FIG. 5 illustrates that the length of a signal path from a transmit channel to a sense channel can be different depending on the particular drive line and sense line pair. For example, the signal path lengths of the component signals from the pixels to the receive channel can be different. In sense line 206a, for example, the path length of component signal 517 can be longer than the path length of component signal 519. Likewise, in sense line 206b, the path length of component signal 521 can be longer than the path length of component signal 523. In addition, the signal path lengths of the drive signals can vary by channel. For example, the path length from TransmitC[0] to pixel 512 of drive line 204a with sense line 206a can be less than the path length from TransmitC[0] to a pixel 525 of drive line 204a with sense line 206b. For AC signals, for example, variations in the delays in the signals can cause the phases of the component signals to be different, which can be reflected in the superposition of the component signals forming the composite sense signal SenseSig used to obtain Qsig_tot$_C$. Therefore, stimulation matrix 407 (and therefore, Vstim×M̃$_C$) might not accurately reflect the how the sense signals are actually formed, e.g., because the stim matrix does not account for the signal delays in the system. Because the total signal charges Qsig_tot$_C$ of equation (4) can be obtained from the sense signals, the resulting phase matrix might not yield accurate results for the Csig$_C$ values. However, the phase components of equation (4) may be modified to compensate for factors such as variation in phase delay associated with, for example, a particular drive/sense line pair.

For example, a phase delay associated with the stimulation signal of each pixel in a channel can be added to the corresponding phase components of equation (4):

Qsig_tot$_C$(S)=Vstim×cos(Pz_stim$_C$(0,S)+ϕ$_C$(0))×
Csig$_C$(0)+Vstim×cos(Pz_stim$_C$(1,S)+ϕ$_C$(1))×
Csig$_C$(1)+Vstim×cos(Pz_stim$_C$((M−1),S)+ϕ$_C$(M−1))×Csig$_C$(M−1)  (7)

where: ϕ$_C$(R)=the phase delay associated with drive line R of sense channel C

The modified phase components result can be a compensated phase matrix for that channel:

$$\tilde{M}_{C\_comp} = \begin{bmatrix} M_{C\_comp}(0,0) & M_{C\_comp}(1,0) & \dots & M_{C\_comp}(M-1,0) \\ M_{C\_comp}(0,1) & M_{C\_comp}(1,1) & & \\ M_{C\_comp}(0,2) & M_{C\_comp}(1,2) & & \\ \dots & & \dots & \\ \dots & & & \dots \\ M_{C\_comp}(0,P-1) & M_{C\_comp}(1,P-1) & & M_{C\_comp}(M-1,P-1) \end{bmatrix} \quad (8)$$

wherein: $M_{C\_comp}(R,S) = \cos(Pz\_stim_C(R,S) + \phi_C(R))$

The inverse of the compensated phase matrix can be used as the decode matrix in equation (6):

$$\tilde{C}sig_C = \frac{\tilde{M}_{C\_comp}^{-1}}{Vstim} \times \tilde{Q}sig\_tot_C \quad (9)$$

The decode matrix $$\frac{\tilde{M}_{C\_comp}^{-1}}{Vstim}$$

can be stored in decode matrix RAM 321 and used along with Qsig_tot$_C$ measurements obtained from the sense signals and stored in result memory 315 to determine Csig$_C$ values by calculating equation (9).

Figure 6A:
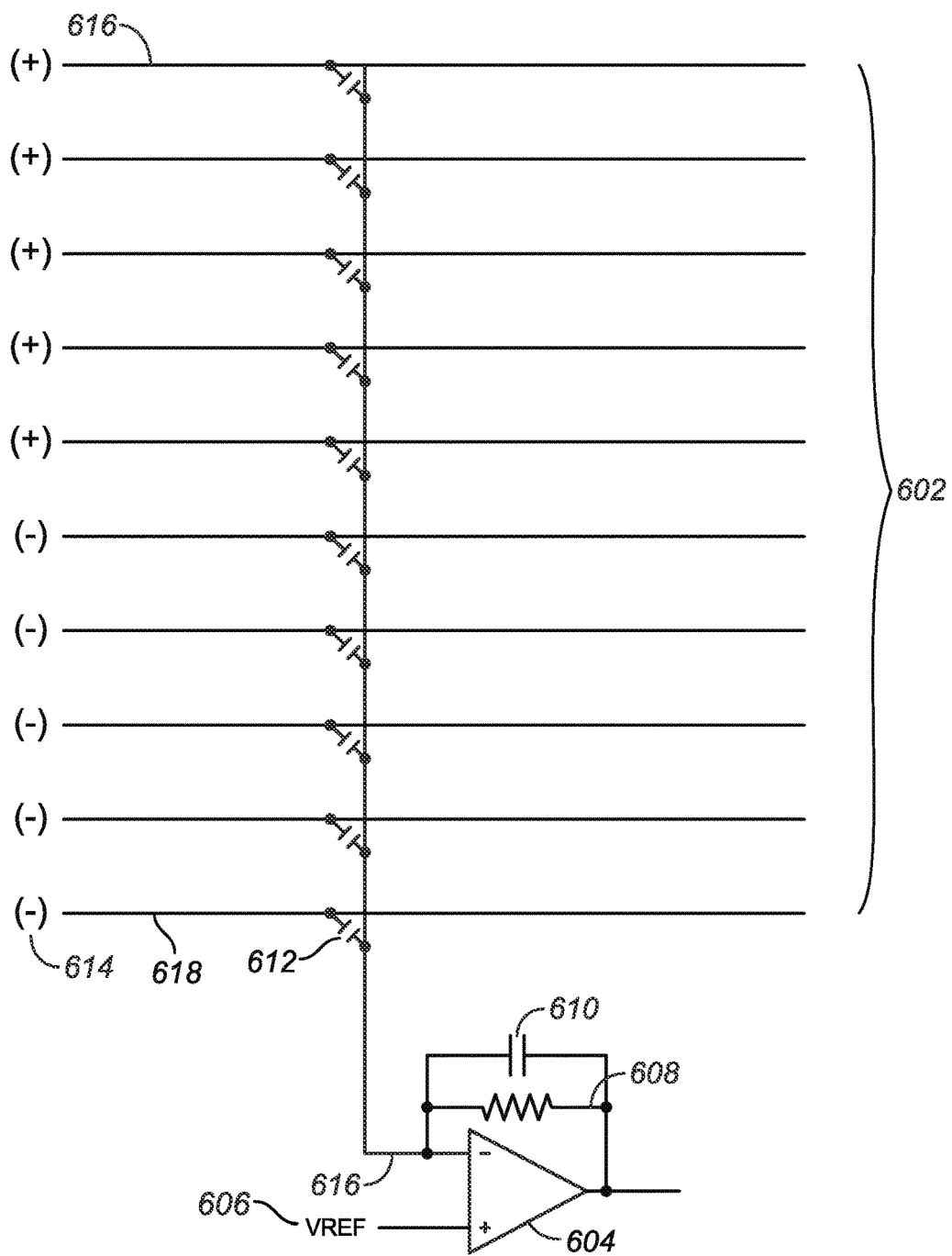
FIG. 6a illustrates a sense channel along with multiple drive line pairings according to examples of the disclosure.
Figure 8:
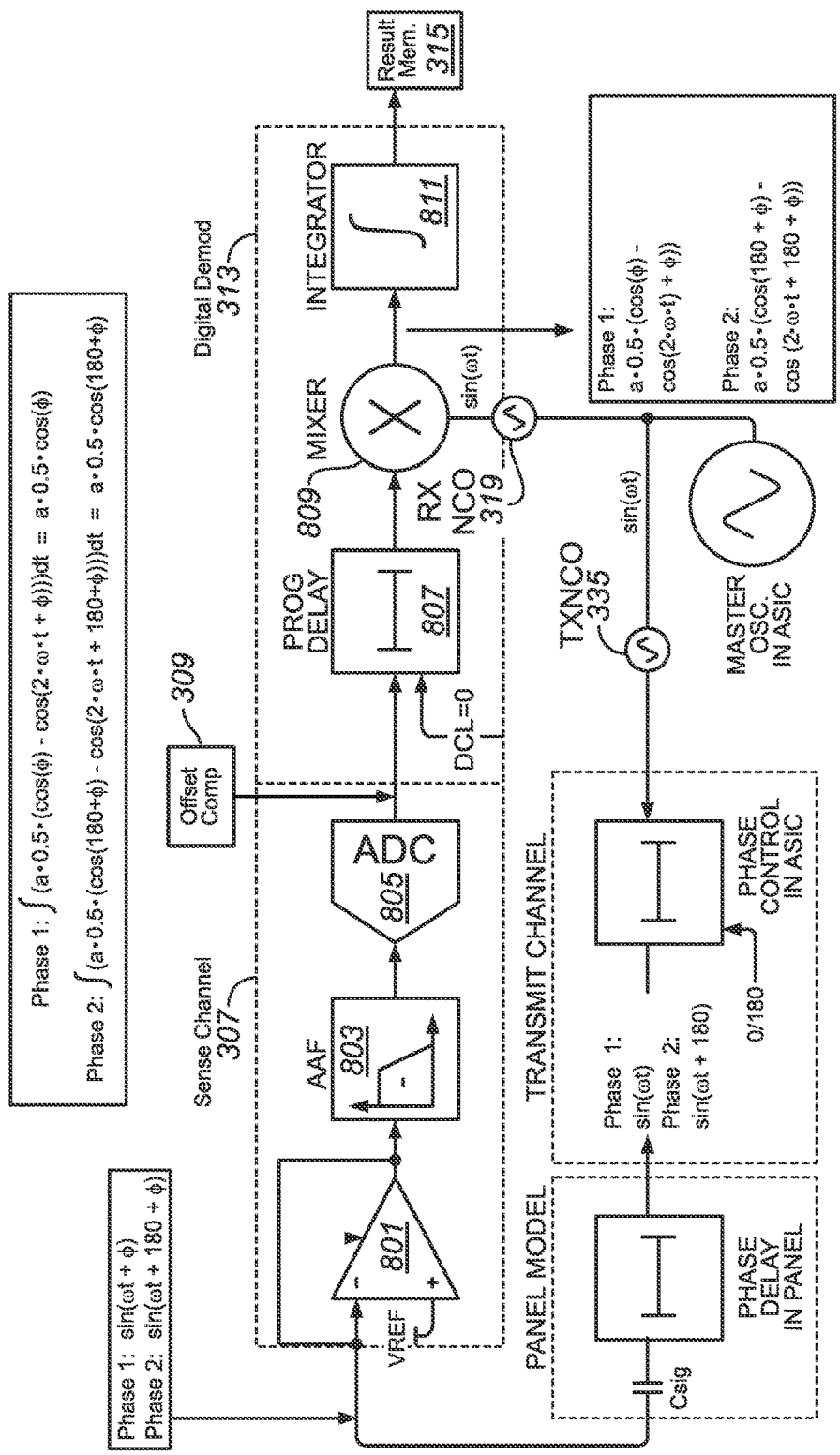
FIG. 8 illustrates an example sense channel and the first stage of the multi-stage vector demodulation engine according to examples of the disclosure.

The differences in the length of a signal path from a transmit channel to a sense channel amongst the different drive line/sense line pairs can cause demodulation performance degradation at the sense channel (the sense channel is described in further detail below with reference to FIG. 8). FIG. 6a illustrates a sense channel along with multiple drive line pairings according to examples of the disclosure. Sense line 616 can be capacitively coupled to a plurality of drive lines 602, as described above, to form a plurality of mutual capacitive touch nodes 612. The sense line 616 can be connected to an operational amplifier 604 at its inverting input, with the non-inverting input connected to a reference voltage 606. In this configuration, the operational amplifier can be configured in a virtual ground configuration.

As described above, each drive line 602 can be driven with a stimulation signal of varying phases. Specifically, the phase of the stimulation signal can be varied to be 0 degrees or 180 degrees at each drive line such that some of the drive lines 602 can be stimulated with a positive phase (i.e., at 0 degrees phase) and some of the stimulation signals can be stimulated at a negative phase (i.e., at 180 degrees phase). Note that positive and negative can refer to the amplitude of the signal. A positive phase signal can have a positive amplitude and a 0 degree phase, whereas a negative phase signal can have positive amplitude but a 180 degree phase which causes the positive amplitude to be inverted and thus negative. In the case in which the stimulation matrix is a Hadamard matrix, the distribution of drive lines that receive a positive stimulation signal and drive lines that receive a negative stimulation signal can be equal for each step except a common mode step (e.g. for S>0). For instance, in the example of FIG. 6a, the phases 614 of drive lines 602 can be evenly distributed such that five of the ten drive lines have a positive phase (denoted by a +) and five of the drive lines have a negative phase (denoted by -). By stimulating the drive lines such that the number of negative phase and positive phase drive lines can be equal, the total charge received at sense amplifier 604 can be substantially zero provided that the signal capacitances $Csig_C(0)$ through $Csig_C(M-1)$ can be equal. The phases illustrated in FIG. 6a can represent one step in the multi-stage touch image acquisition as described above.

Equation 4 above can represent the total charge seen by the sense amplifier 604 of FIG. 6a. Assuming that $Csig_C(0)$ through $Csig_C(M-1)$ can be all equal (this can be true in a no-touch situation), when the drive lines 602 are stimulated such that a portion can be driven at a positive phase and an equal portion can be driven at a negative phase, $Qsig\_tot_C(S)$ can be substantially zero. When the drive lines 602 are stimulated with a Hadamard matrix, such that there can be an equal number of drive lines being driven with a positive phase and negative phase, the total charge can be zero for each step except the common mode step.

Figure 6B:
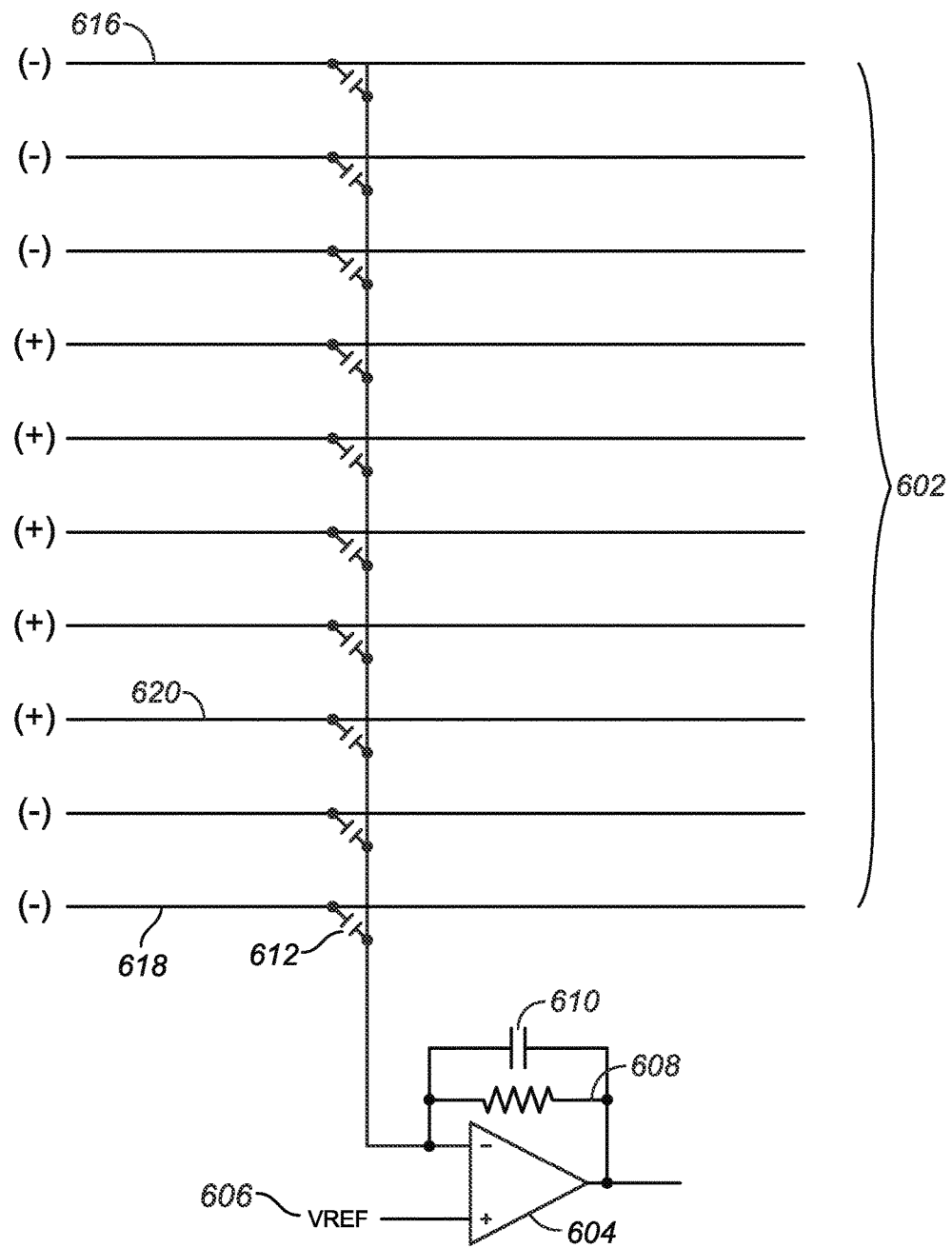
FIG. 6b illustrates another exemplary sense channel along with multiple drive line pairings according to examples of the disclosure.

FIG. 6b illustrates the sense channel of FIG. 6a with a different stimulation pattern according to examples of the disclosure. The example of FIG. 6b can illustrate a different step in the multi-stage touch image acquisition process. In the example of FIG. 6b, the ten drive lines can also be stimulated with an equal number of positive and negative stimulation signals; however, the drive lines that can be stimulated with a positive stimulation signal and the lines that can be stimulated with a negative stimulation signal can be different. In the example of FIG. 6a, as illustrated, the first five drive lines 602 can be stimulated with positive phases, while the next five drive lines can be stimulated with negative phases. In the example of FIG. 6b, as illustrated, the first three drive lines 602 can be stimulated with a negative phase, the next five drive lines can be stimulated with a positive phase, and the last two drive lines can be stimulated with a negative phase. Comparing FIG. 6a to FIG. 6b, whereas both examples can have an equal number of positive and negative stimulated drive lines, the distribution of drive lines stimulated at positive phases and drive lines stimulated at negative phases can be different.

Ensuring that $Qsig\_tot_C(S)$ is substantially zero during a no-touch condition can be important in ensuring that the sense amplifier 604 does not reach saturation when a touch signal is present. If the total charge is not substantially zero during a no-touch condition, then when a touch signal is present, the added charge associated with the touch event may drive the amplifier into saturation, thus possibly leading to the touch signal being "clipped." A clipped touch signal can degrade the fidelity of the touch measurement. Furthermore, a non-zero charge can also decrease the amount of noise headroom in the amplifier. The noise headroom can refer to the amount of charge generated by ambient and parasitic noise sources of the device that can be tolerated by the amplifier, such that when a touch signal is present the amplifier does not saturate and cause signal clipping.

Figure 12:
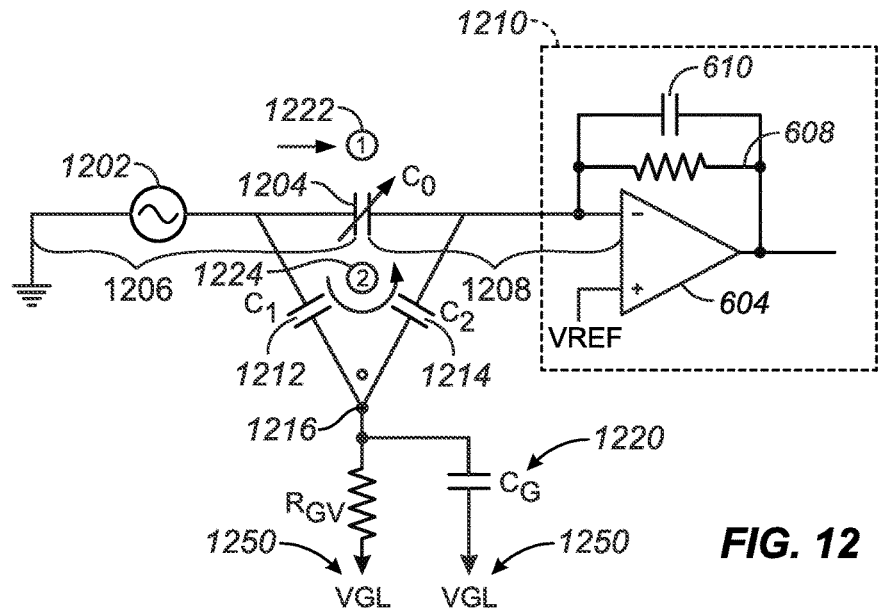
FIG. 12 illustrates an example touch sensing circuit with parasitic capacitive pathways according to examples of the disclosure.

Although ideally, $Csig_C(0)$ through $Csig_C(M-1)$ can be all equal, in some touch screens, for example the in-cell touch screens described in U.S. Pat. No. 8,654,083, titled "TOUCH SCREEN LIQUID CRYSTAL DISPLAY" by Steve Porter Hotelling et al., the effective signal capacitance Csig can vary as a function of the distance between a given row being stimulated and the input of the sense amplifier 604, i.e. the signal path length from a transmit channel to a sense channel. For example, FIG. 12 illustrates an example touch sensing circuit with parasitic capacitive pathways according to examples of the disclosure. The proximity of various electronics to touch detection hardware can create parasitic pathways which can cause the signal capacitance Csig to become dependent on stimulus frequency and the distance between the sense amplifier 604 and touch node 1204. FIG. 12 illustrates an example touch sensing circuit with parasitic capacitive pathways created by proximal gate lines. While parasitic capacitive pathways created by gate lines are shown for purposes of illustration, one skilled in the art would recognize that the disclosure is not so limiting and the concepts described below could be applied to parasitic capacitive pathways created by other electronics proximal to the touch sensing hardware, such as power circuitry or other display circuitry. As illustrated in FIG. 12, the touch circuit can contain parasitic capacitive pathways that are created by the proximity of a gate line 1216. As illustrated, two such pathways can be created: the first, depicted by capacitor 1212, can represent the mutual capacitance between the drive line 1206 and the gate line 1216. The second pathway, depicted by capacitor 1214, can represent the mutual capacitance between the sense line 1208 and the gate line 1216.

When a stimulation signal is applied by the stimulation voltage source 1202 to drive line 1206, the parasitic capacitive pathways can create alternate ways for charge to be coupled onto the sense lines. As illustrated, the first pathway 1222 can represent the mutual capacitance between the drive line 1206 and the sense line 1208 at touch node 1204. The signal received by the detection circuit 1210 can be characterized by equation (37) below:

$$(s*C_o)/(1+\tau_1*s) \quad (37)$$

where: s can represent the complex frequency, $C_o$ can represent the mutual capacitance between the drive line 1206 and sense line 1208, and $\tau_1$ can represent the RC time constant of pathway 1222. A second pathway 1224 can be created via the mutual capacitance 1212 between the drive line 1206 and gate line 1216, and the mutual capacitance 1214 between the gate line 1216 and the sense line 1208. Charge from the stimulation voltage source 1202 can be coupled to the gate line 1216 and from the gate line 1216 to the sense line 1208. This series of couplings can thus couple a second signal onto sense line 1208 for detection by the detection circuit 1210. The signal created by the second pathway 1224 can be characterized by equation (38):

$$(s^2*R_{gv}*C_1*C_2)/(1+\tau_2*s) \quad (38)$$

where: $R_{gv}$ can represent the effective resistance 1218 from the VGL supply 1250 to gate line 1216 at the second pathway 1224 (discussed in further detail below), $C_1$ can represent the mutual capacitance between the drive line 1206 and the gate line 1216, $C_2$ can represent the mutual capacitance between the sense line 1208 and the gate line 1216, and $T_2$ can represent the RC time constant of pathway 1224. $T_2$ can be represented by equation (39):

$$R_{gv}*(C_1+C_2+C_G) \quad (39)$$

where: $C_G$ can represent the effective capacitance 1220 of the gate line 1216. The effective capacitance 1220 of the gate line 1216 can be an amalgamation of various capacitances created by display electronics such as the data lines, pixel electrodes and common electrodes. The effective resistance $R_{gv}$ 1218 can be a composite of different resistances and can include the routing resistance from the VGL supply 1250 to the gate driver, the gate drive output resistance and the gate line resistance from the gate driver output to gate line 1216 at the second pathway 1224.

Equation 40 below can represent the effective signal seen by detection circuit 1210, which is the combination of the signals from both pathways:

$$(s*C_o)/(1+\tau_1*s)+(s^2*R_{gv}*C_1*C_2)/(1+\tau_2*s) \qquad (40)$$

As discussed above, the effective signal capacitance can be a function of the effective resistance $R_{gv}$ 1218, which can vary as a function of the distance (e.g., vertical distance) between the VGL supply 1250 and gate driver for a given gate line 1216 and as a function of the length of gate line 1216 (e.g., horizontal distance) between gate driver and a given touch node. For example, the distance between the gate driver and VGL supply 1250 can increase the effective resistance $R_{gv}$ 1218 seen by the gate line 1216. As another example, the length of the gate line 1216 between the gate driver and touch node 1204 can change the effective resistance $R_{gv}$ 1218 and effective capacitance 1220 of gate line 1216. The amount of coupling through the second pathway 1224 can vary as a function of the effective resistance 1218 of gate line 1216. A larger effective resistance $R_{gv}$ 1218 can result in more coupling through second pathway 1224 and a larger effective signal capacitance Csig between stimulus source 1202 and detection circuit 1210.

Referring to FIG. 6A, drive line 616 can be the row furthest from sense amplifier 604 (and VGL supply 1250) and thus have a larger effective signal capacitance, and drive line 618 can be the row closest to sense amplifier 604 (and VGL supply 1250) and thus have a smaller signal capacitance. That means that the amount of charge into the sense amplifier 604 may vary as a function of the stimulation pattern. For example, referring to FIG. 6A, if Csig(0:M/2−1)<Csig (M/2:M−1), stimulating rows 0 to M/2−1 with a positive phase and stimulating rows M/2 to M−1 with a negative phase can result in a total absolute charge greater than 0 at sense amplifier 604. In mathematical terms:

$$Q_{sig} = \left| \text{VSTM\_P} * \sum_{S=0}^{S=\frac{M}{2}-1} C_{sig}(S) + \text{VSTM\_N} * \sum_{S=M/2}^{S=M-1} C_{sig}(S) \right| > 0 \qquad (10)$$

where: Csig(0:M−1) can be the M row signal capacitance across a sense line, VSTM_N can be the stimulus amplitude for the negative stimulus, VSTM_P can be the stimulus amplitude for the positive stimulus, Qsig can be the signal charge into a sense amplifier 604.

More generally, the charge into the sense amplifier as a function of step S can be defined as follows:

$$Q_{sig}(S) = \text{VSTM} * M(:,S) * C_{sig} \qquad (11)$$

where: Qsig(S) can be the charge into the sense amplifier for step S, M(S) can be a step vector from the stimulus matrix, and Csig can be the Csig vector and VSTM can be the stimulus voltage.

Referring to FIG. 6b, a similar phenomenon described above can be seen. Drive lines 602 can be stimulated with a different distribution of an equal number of positive and negative phases. For example, drive line 616 can be stimulated with a negative phase and drive line 620 can be stimulated with a positive phase. The effective capacitance for a stimulation channel can be different because of the different distances between each drive line and sense amplifier 604. As a result, the total charge sensed by the sense amplifier 604 during a no touch condition can be non-zero.

As discussed above, performance can be improved by having zero or substantially zero total charge sensed at sense amplifier 604 during a no touch condition. The amplitude of the stimulus applied to drive lines 602 can be adjusted such that the total charge sensed during a no touch condition can be zero or substantially zero. For example, the positive stimulus amplitude can be derived from equation (10) for which the signal charge Qsig becomes 0:

$$\text{VSTM\_P} = \text{VSTM\_N} * \frac{\sum_{S=M/2}^{S=M-1} C_{sig}(S)}{\sum_{S=0}^{S=\frac{M}{2}-1} C_{sig}(S)} \qquad (12)$$

Matrix M of equation (11) can be split into matrices Mn and Mp, which contain only positive and negative elements, respectively. In more general terms the positive stimulus amplitude can be defined as:

$$\text{VSTM\_P}(S) = -\text{VSTM\_N}(S) * \frac{Q_{sig}\_P(S)}{Q_{sig}\_N(S)} \qquad (13)$$

where: Qsig_P(S) can represent the total positive charge into the sense amplifier and Qsig_N(S) can represent the total negative charge into the sense amplifier. Qsig_P(S) and Qsig_N(S) can be defined as:

$$Q_{sig}\_P(S) = M\_P(:,S) * C_{sig} \qquad (14)$$

$$Q_{sig}\_N(S) = M\_N(:,S) * C_{sig} \qquad (15)$$

where: M_P(;S) can be the portion of row vector S that contains only the positive elements of the step vector; M_N(:,S) can be the portion of row vector S that only contains negative elements of the step vector, and Csig can be the Csig vector.

A mismatch compensated stimulus matrix $\tilde{M}_{C\_MM}^{-1}$ can be constructed as shown in equation (16):

$$\tilde{M}_{C\_MM}^{-1} = \begin{bmatrix} V_{STM\_PIN}(0) \cdot M_{C\_comp}(0,0) & V_{STM\_PIN}(0) \cdot M_{C\_comp}(1,0) & \ldots \ldots \ldots & V_{STM\_PIN}(0) \cdot M_{C\_comp}(M-1,0) \\ V_{STM\_PIN}(1) \cdot M_{C\_comp}(0,1) & V_{STM\_PIN}(1) \cdot M_{C\_comp}(1,1) & \ldots \ldots \ldots & \ldots \\ V_{STM\_PIN}(2) \cdot M_{C\_comp}(0,2) & V_{STM\_PIN}(1) \cdot M_{C\_comp}(1,2) & \ldots \ldots \ldots & \ldots \\ \ldots & \ldots & \ldots \ldots \ldots & \ldots \\ \ldots & \ldots & \ldots \ldots \ldots & \ldots \\ V_{STM\_PIN}(P-1) \cdot M_{C\_comp}(0,P-1) & V_{STM\_PIN}(P-1) \cdot M_{C\_comp}(1,P-1) & \ldots \ldots \ldots & V_{STM\_PIN}(P-1) \cdot M_{C\_comp}(M-1,P-1) \end{bmatrix} \qquad (16)$$

Each negative element in step vector S can be multiplied by VSTM_N(S) and each positive element in step vector S can be multiplied by VSTM_N(S), where VSTM_P(S) and VSTM_N(S) can be computed according to equation (13). A decode matrix can be used in the multistage vector demodulation engine 109 and can be the inverse of the mismatch compensated stimulus matrix $\tilde{M}_{C\_MM}^{-1}$.

Figure 7:
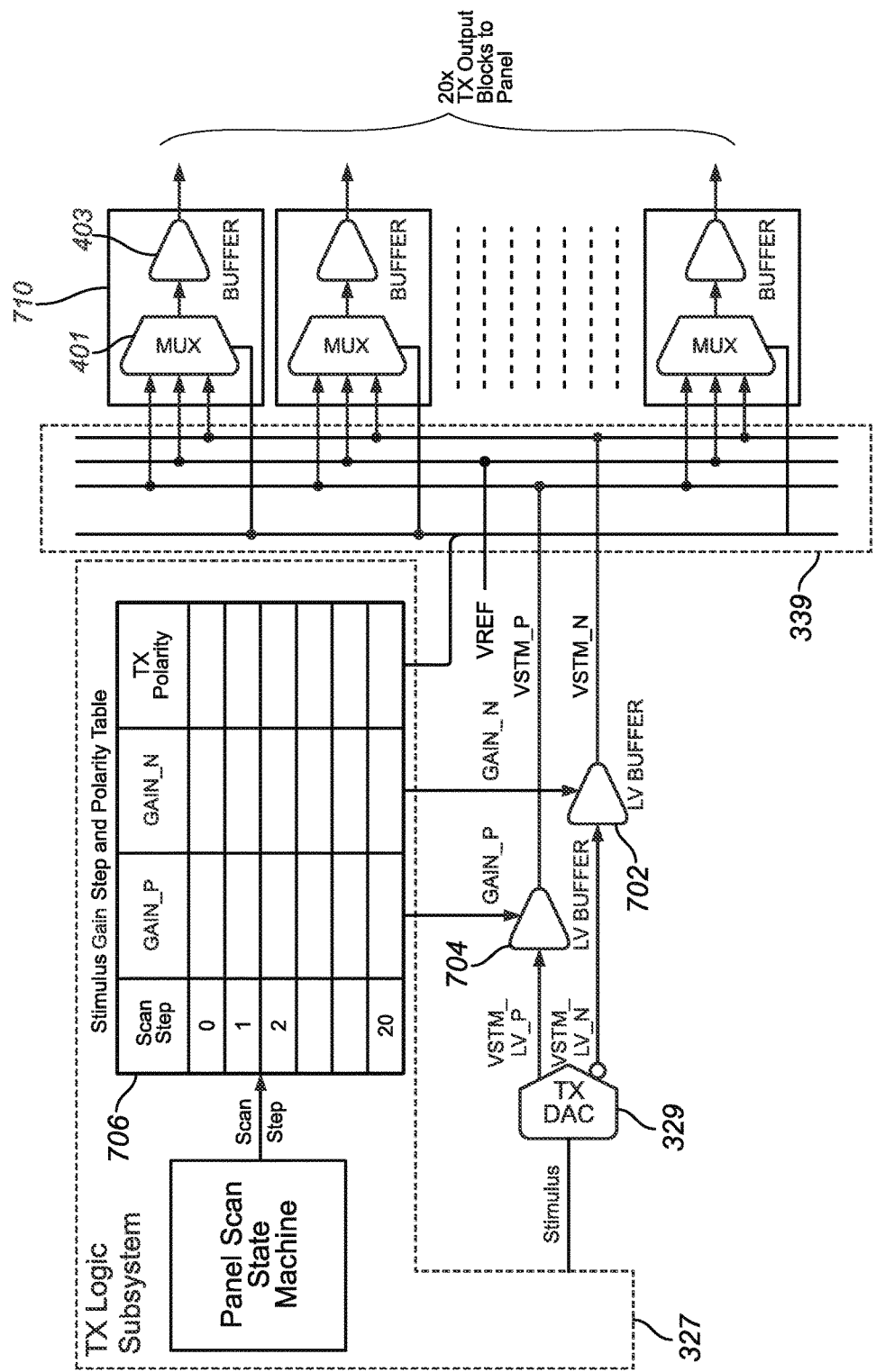
FIG. 7 illustrates an example transmit channel with panel mismatch compensation capabilities according to examples of the disclosure.

FIG. 7 illustrates an exemplary panel mismatch compensation circuit according to examples of the disclosure. Differential transmit (Tx) DAC 329 can be connected to Tx Logic 327 as described above with reference to FIG. 3. The circuit of FIG. 7 can include DAC buffers 702 and 704. Each buffer can be connected to one of the two outputs of Tx DAC 329 at its input and then connected to an array of TX output blocks 710. Each TX output block can include a MUX 401 and a buffer 403. The DAC buffers 702 and 704 can be connected to Tx Logic 327 as well. DAC buffers 702 and 704 can be used to control the gain applied to the positive phase drive signal and the negative phase drive signal. The gain can be controlled such that the effects due to the difference in signal path experienced by both the positive phase drive signal and the negative phase drive signal can be mitigated. Referring to the example illustrated in FIG. 6a, because the signal paths of the positive driven drive lines can be longer than the signal paths of the negative driven drive lines, the gain applied to DAC buffer 704 can be decreased relative to the gain of DAC buffer 702, such that the increased signal capacitance for the positive drive lines can be balanced out by the decreased gain and thus decreased positive stimulus level. In this way, even though the positive driven drive lines see increased signal capacitance due to their longer signal paths, the reduced gain of the DAC buffer can allow the net charge in a no-touch condition seen at sense amplifier 604 to be substantially zero. The gain of the compensation buffers can be set to counteract the effects of varying signal path lengths.

Figure 13A:
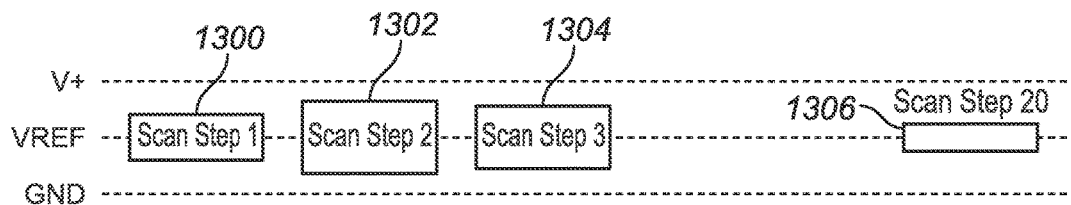
FIGS. 13A and 13B illustrate exemplary voltage diagrams of the output of a sense amplifier with and without mismatch compensation according to examples of the disclosure.
Figure 13B:

FIGS. 13A and 13B illustrate exemplary voltage diagrams of the output of a sense amplifier 604 with and without mismatch compensation according to examples of the disclosure. FIG. 13A illustrates an exemplary voltage diagram of the output of sense amplifier 604 without mismatch compensation. As described above, the distribution of drive lines stimulated at positive phases and drive lines stimulated at negative phases can be different for different scan steps. The output from a first scan step 1300 can be a sinusoid with a first amplitude, the output from a second scan step 1302 can be a sinusoid with a second amplitude and a third scan step 1304 can be a sinusoid with a third amplitude. In an example with 20 scan steps, the final scan step 1306 can be a sinusoid with a given amplitude. The amplitude at the output from each scan step from a first scan step 1300 to a final scan step 1306 can vary due the polarity distribution of drive lines and the variation in effective signal capacitance for various drive signal paths. The amplitude of the output of sense amplifier 604 can limit the headroom left for external noise and can degrade the fidelity of the touch measurement. For example the output of the second scan step 1302 has much less headroom available than the final scan step 1306.

Using gain compensation buffers can minimize the output signal at sense amplifier 604 during the no touch condition and can improve performance FIG. 13B illustrates an exemplary voltage diagram of the output of sense amplifier 604 with mismatch compensation applied. The output at sense amplifier 604 can be reduced to zero or substantially zero for each scan step from the first scan step 1310 through the final scan step 1316. The output from each scan step can be more uniform in amplitude than the output from each scan step without using gain compensation buffers. For example the first scan step 1310, second scan step 1312 and third scan step 1314 can have the same or substantially the same amplitude. Zero or substantially zero signal at the sense amplifier 604 can provide additional headroom for external noise and can improve the fidelity of the touch measurement.

The gain of the compensation buffers can either be set during the initial calibration of the touch sensitive device or can be dynamically adjusted during the operation of the device. In the example where the gain of the compensation buffers is set during an initial calibration of the device, each step of the touch scan can be applied to the drive lines one at a time (while no touch is present). While the scan step is being applied, the gain of the compensation buffers can be swept (i.e., cycled through various values) and the total charge at the input to the sense amplifier can be measured. The values of gain for DAC buffers 702 and 704 that produce the minimum amount of charge (i.e., closest to zero) can be empirically determined. Once the optimal compensation of gains in DAC buffers 702 and 704 are determined, those values can be stored in a matrix 706 that can be stored in Tx logic 327. The matrix 706 can contain the optimal gain for DAC buffer 704 (the positive signal buffer), denoted as GAIN_P in the matrix illustrated in FIG. 7. The matrix 706 can also store the optimal gain for DAC buffer 702 (the negative signal buffer) denoted as GAIN_N in the matrix illustrated in FIG. 7. Each step of the touch scan can be applied, one at a time, with the gains empirically determined and stored in matrix 706, until all scan steps have been completed. During operation of the device, during each scan step, the gains GAIN_P and GAIN_N corresponding to the particular scan step can be accessed from matrix 706 and applied to the DAC buffers 702 and 704. In the example where the gain of the DAC buffers is set dynamically, the device can determine that no-touch is present on the device and can perform the gain calibration procedure described in the preceding paragraph.

An example process of obtaining $Csig_C$ values from the sense signals according to examples of the disclosure will now be described with reference to FIGS. 8-9. The example process implements a multi-stage demodulation/decode in which $Qsig\_tot_C$ measurements can be obtained through a signal demodulation in one stage and a vector/matrix operation can be performed in the 2nd stage to determine the $Csig_C$ values. FIG. 8 illustrates details of one of the sense channels 307 and digital demodulation section 313 according to examples of the disclosure. As shown in FIG. 8, sense channel 307 includes a charge amplifier 801, an anti-alias filter (AAF) 803, and an analog-to-digital converter (ADC) 805. Digital demod section 313 includes a programmable delay 807, a mixer (signal multiplier) 809, and an integrator 811. In each step of the scan, amplifier 801 of sense channel 307 receives a composite signal charge as described in equation (7) along with a programmable offset charge. The charge amplifier 801 then converts the offset compensated composite signal charge into a voltage VSIG via feedback capacitor CFB such that the output of the pre-amplifier becomes: $Vsig_C = (Qsig\_tot_C - Qoff_C)/Cfbk_C$.

In some cases, the sense signal can be adjusted by offset compensator 309 prior to being input to amplifier 801. Adjusting the offset of the digital signal can reduce the dynamic range of some stimulation signals generated from highly variable stimulation matrices. In particular, some highly variable stimulation matrices may result in sense signals having a dynamic range greater than the dynamic input range of the charge amplifier 801, that is, the maximum signal magnitude that the amplifier can accept before the charge amplifier saturates. For example, in the case that the stimulation matrix is a Hadamard matrix, in one of the steps in the scan all of the channels can be driven with stimulation signals having the same phase, and it could be possible that all of the resulting component sense signals would add up to generate a composite sense signal with an amplitude that saturates amplifier 801. In this case, offset compensation would be used to subtract sufficient charge from the input charge as to prevent the charge amplifier from saturating. Offset compensation during a scan can be performed on-the-fly, that is, different offset compensation can be applied during different steps of the scan.

In another example, saturation of amplifier 801 may be mitigated by adjusting, for example, the feedback capacitance of the amplifier. In this case, individual sense channels could be adjusted, but the adjustment would remain the same for each step in a scan. This approach may be acceptable in the case that the stimulation matrix being used causes the same or similar imbalances of signals in the channels throughout the scan, and the amount of adjustment is not too great, e.g., up to a factor of 2. For example, using a circulant matrix as the stimulation matrix causes a fixed imbalance across all steps.

For the sake of clarity, the processing of a sense signal to obtain a value for Qsig_total is described below in reference to processing a single component of the sense signal of one sense channel (resulting from the stimulation of one of the channel's pixels) to obtain a single Qsig component of Qsig_total for that sense channel. However, it is understood that the analysis applies to all component signals, and that an actual Qsig_total result may be understood as simply a superposition of the individual Qsig results of the other component signals.

When a stimulation signal, Vstim, is applied to the drive line of a pixel, the AC portion of the stimulation signal, Vstim_AC(t), can be coupled through to the sense line, generating a signal charge Qsig(t) that tracks Vstim_AC(t) with an amplitude proportional to the signal capacitance Csig of the pixel. From equation (1) above:

$$Qsig(t) = Csig \times Vstim\_AC(t) \qquad (17)$$

The feedback capacitance in the feedback path of the charge amplifier 801 converts the injected signal charge into an output voltage relative to the reference voltage of VREF of the charge amplifier $$V_{amp\_out}(t) = \frac{Qsig(t)}{C_f} \qquad (18)$$

Substituting for Qsig(t) using equation (17) yields:

$$V_{amp\_out}(t) = \frac{Csig}{C_f} \times Vstim\_AC(t) \qquad (19)$$

Thus, charge amplifier 801 outputs a signal whose amplitude can be the stimulus amplitude Vamp_out(t) scaled by the gain (Csig/Cf) of the charge amplifier. In more general terms, sensor panel 124 adds an amplitude modulation to the drive signal, the amplitude modulation carrying information about something to be sensed, e.g. the a finger, water level, etc.

The output of charge amplifier 801 can be fed into AAF 803. AAF 803 can attenuate noise components above the nyquist sampling limit of the ADC sufficiently to prevent those components from aliasing back into the operating frequency range of the multi-touch controller. Furthermore, AAF 803 can attenuate any noise outside the frequency operating range of the multi-touch controller and therefore helps to improve the Signal-to-Noise ratio. It also can be important to properly select the sampling clock FCLK_DAC of the TX DAC. Generating a signal of frequency FSTM at the TX DAC clock rate will introduce images in the spectrum of the TX DAC output signal at n*FCLK_DAC+/−FSTM whereas N=1, 2 . . . , to infinity. The images will appear in the composite signal entering the receive channel. Upon sampling the composite signal with the ADC in the receive channel, those images will be folded around the sampling frequency FCLK_ADC at which the ADC samples the composite touch signal. The output of the ADC therefore has the following frequency components: N*(FCLK_DAC+/−FCLK_ADC)+/−FSTM. If the DAC and ADC clock rate FCLK_DAC and FCLK_ADC, respectively, are the same frequency, these images can appear in the passband. In the above example, one possible frequency component would be (FCLK_DAC−FCLK_ADC)+FSTM=FSTM and therefore would appear as a undesirable in band component which would lead to reduced SNR and therefore reduced touch performance Therefore, it can be beneficial to select a TX DAC sampling frequency FCLK_DAC that can be different from the ADC sampling rate. This can prevent the images from folding back into the pass-band. In one example, FCLK_DAC can be twice of the ADC clock rate FCLK_ADC. The two clock sources should be correlated, i.e. based on the same master clock. It can be beneficial to make the DAC sampling clock higher in frequency than the ADC sampling clock as DACs can consume less power than the power consumed by all ADCs combined for the same increase in sampling clock frequency.

The output of AAF 803 can be converted by ADC 805 into a digital signal, which can be sent from sense channel 307 to digital demodulation section 313. Digital demodulation section 313 demodulates the digital signal received from sense channel 307 using a homodyne mixing process in which the signal can be multiplied with a demodulation signal of the same frequency. In order to increase the efficiency of the mixing process, it may be desirable to adjust the phase of the sense channel output signal to match the phase of the demodulation signal. Stimulating a pixel of sensor panel 124 with Vstim+ and processing the resulting sense signal as described above would result in the following output from sense channel 307:

$$V_{sense\_ch\_outV+}(t) = \frac{Csig}{C_f} \times V_0 \sin(\omega t + \theta) \qquad (20)$$

where:
  $V_0$=the amplitude of the AC portion of Vstim=2.25V
  $\theta$=the relative phase delay between the signal output of ADC 805 and the demodulation signal for a given sense channel For stimulation with Vstim−, the resulting output from ADC 805 would be:

$$V_{sense\_ch\_outV-}(t) = \frac{Csig}{C_f} \times V_0 \sin(\omega t + 180° + \theta) \qquad (21)$$

The relative phase delay θ can be an aggregate of delays caused by various elements of the system, such as the geometry of the signal paths, the operation of the output buffers, etc. In general, the various delays in the system can be separated into two categories, delays that apply equally to all drive lines of a sense channel, referred to as global delays herein, and delays that vary among the drive lines of the sense channel, referred to as individual line delays herein. In other words, global delays affect all component signals of the composite sense signal equally, while individual line delays results in different amounts of delay for different component signals. The relative phase delay can be represented as:

$$\theta = DCL + \phi(R) \quad (22)$$

where:
DCL=the sum of all global delays (referred to herein as the composite global delay) affecting a sense channel
$\phi(R)$=the individual line delay associated with drive line R of a sense channel Substituting equation (22) into equations (20) and (21) yields:

$$V_{sense\_ch\_outV+}(t) = \frac{Csig}{C_f} \times V_0 \sin(\omega t + DCL + \phi(R)) \quad (23)$$

$$V_{sense\_ch\_outV-}(t) = \frac{Csig}{C_f} \times V_0 \sin(\omega t + 180° + DCL + \phi(R)) \quad (24)$$

Since the global delays affect all of the component signals of the sense signal equally, once the composite global delay DCL has been determined for a channel, the global portion of the phase delay of sense channel output signal can be removed by programmable delay 807, yielding:

$$V_{mixer\_inV+}(t) = \frac{Csig}{C_f} \times V_0 \sin(\omega t + \phi(R)) \quad (25)$$

$$V_{mixer\_inV-}(t) = \frac{Csig}{C_f} \times V_0 \sin(\omega t + 180° + \phi(R)) \quad (26)$$

as the signals corresponding to Vstim+ and Vstim−, respectively, that can be input into mixer 809.

Since the individual line delays can be different for different signal components of the sense signal, the individual line delays cannot be removed from the sense signal simply by using a single phase adjustment to the composite sense signal, such as the phase adjustment made by programmable delay 807. However, the individual line delays may be accounted for by the compensated phase matrix $\tilde{M}_{comp}^{-1}$, which is described in more detail below.

The phase-adjusted signal can be sent from programmable delay 807 to mixer 809. Mixer 809 multiplies the phase-adjusted signal with a demodulation signal, $$V_{demod} = \sin(\omega t), \quad (27)$$

which can be generated by RX NCO 319 based on a master oscillator 815. It is noted that the mixing can be performed using digital signals. This can provide higher resolution than in some previous designs, which can result in improved suppression of noise.

The resulting demodulated signal output from mixer 809 as:

$$V_{mixer\_outV+}(t) = \frac{1}{2} \times \frac{Csig}{C_f} \times V_0 \times (\cos(\phi(R)) - \cos(2\omega t + \phi(R))) \quad (28)$$

$$V_{mixer\_outV-}(t) = \quad (29)$$
$$\frac{1}{2} \times \frac{Csig}{C_f} \times V_0 \times (\cos(180° + \phi(R)) - \cos(2\omega t + 180° + \phi(R)))$$

The mixer output can be integrated by integrator 811, yielding:

$$V_{int\_outV+} = \frac{1}{2} \times \frac{Csig}{C_f} \times V_0 \times \cos(\phi(R)) \quad (30)$$

$$V_{int\_outV-} = \frac{1}{2} \times \frac{Csig}{C_f} \times V_0 \times \cos(180° + \phi(R)) \quad (31)$$

Since the integrator has essentially a low pass response, the high frequency component $\cos(2\omega t + 180° + \phi(R))$ can be eliminated leaving only the DC component.

Scaling of the results in integrator 811 by a factor of $2C_f$ results in output signals:

$$V_{int\_scaledV+} = V_0 \times \cos(\phi(R)) \times Csig, \text{ if}$$
$$Vstim(R) = Vstim+ \quad (32)$$

$$V_{int\_scaledV-} = V_0 \times \cos(180° + \phi(R)) \times Csig, \text{ if}$$
$$Vstim(R) = Vstim- \quad (33)$$

from integrator 811. In each step S in a scan of sensor panel 124, drive lines 204 can be driven with either Vstim+ or Vstim− drive signals based on the MUX_SEL values in stim matrix 407 for that step, each stimulation signal generating a component output (32) or (33) of integrator 811 for each sense channel. Thus, for a channel C, the output of integrator 811 can be a linear combination of corresponding components (32) and (33):

$$V_{int\_scaled\_tot\_C}(S) = V_0 \times W_C(0,S) \times Csig(0) + V_0 \times W_C(1,S) \times Csig(1) +$$

$$V_0 \times W_C(M-1,S) \times Csig(M-1) \quad (34)$$

where:

$$W_C(R, S) = \begin{cases} \cos(\phi_C(R)) \overset{if}{\to} Vstim(R, S) = Vstim+ \\ \cos(180° + \phi_C(R)) \overset{if}{\to} Vstim(R, S) = Vstim- \end{cases}$$

The right hand side of equation (34) can be the same as the right hand side of equation (7), with $V_0$ equal to the amplitude, Vstim, of the stimulation signals and $W_C(R,S)$ equal to the components of the compensated phase matrix $\tilde{M}_{C\_comp}$. Therefore, the output voltage of integrator 811, $V_{int\_scaled\_tot\_C}(S)$, at each step can be simply the composite signal charge $Qsig\_tot_C(S)$.

The $Qsig\_tot_C$ values output by a channel's integrator 811 can be posted to result memory 315, forming a $Qsig\_tot_C$ vector:

$$Qsig\_tot_C(S) = \begin{bmatrix} Qsig\_tot_C(0) \\ Qsig\_tot_C(1) \\ Qsig\_tot_C(2) \\ \\ Qsig\_tot_C(P-1) \end{bmatrix} \quad (35)$$

that can be used in a decoding operation to determine the Csig values for that channel. An example vector decode operation according to examples of the disclosure will now be described. Referring to FIG. 3, vector operator 317 reads the Qsig_tot$_C$ vector from memory 315 and reads the decode matrix $$\frac{\tilde{M}_{C\_comp}^{-1}}{Vstim}$$

from decode matrix RAM 321. Vector operator 317 then performs vector multiplication of the Qsig_tot$_C$ vector and the decode matrix $$\frac{\tilde{M}_{C\_comp}^{-1}}{Vstim}$$

according to equation (9) to obtain the Csig$_C$ vector for channel C:

$$\tilde{C}sig_C = \begin{bmatrix} Csig_C(0) \\ Csig_C(1) \\ Csig_C(2) \\ \vdots \\ Csig_C(M-1) \end{bmatrix} \quad (36)$$

The Csig$_C$ vector can be posted to result RAM 323, where it can be read by other systems, such as processor subsystem 102, host processor 128, etc., for sensing touch by comparing the Csig$_C$ vector components with known, static (no touch) values for Csig, for example.

Figure 9:
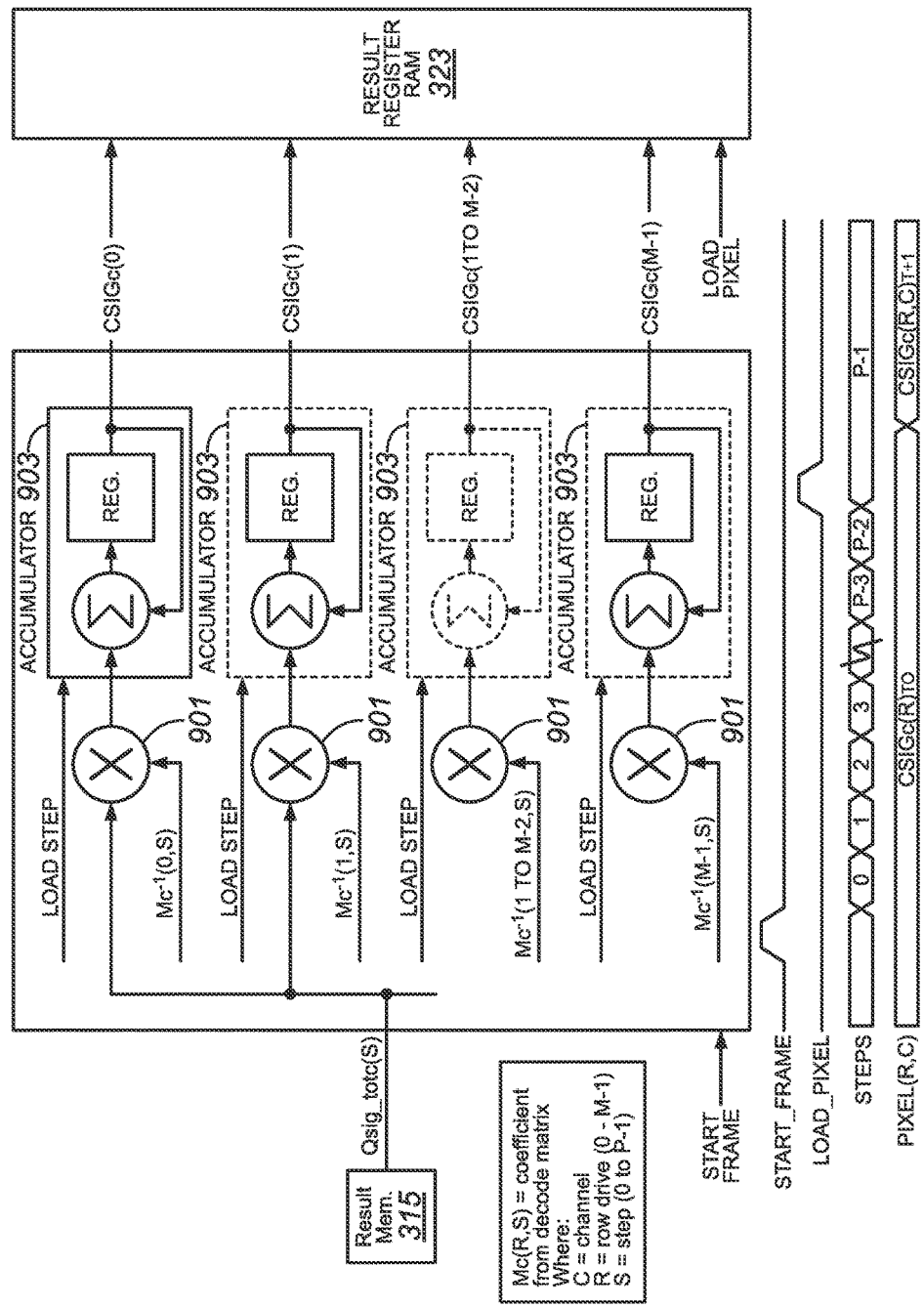
FIG. 9 illustrates an example second stage of the multi-stage vector demodulation engine according to examples of the disclosure.

FIG. 9 shows the 2nd stage of the multi-stage vector demodulation engine 109. Upon assertion of signal START_FRAME, the vector demodulation engine, step counter and registers can be reset. After the first step multipliers 901 (one for each drive line, 0 to M−1) multiply the digital representation of Qsig_tot$_C$ available at the output of integrator 811 and stored in result memory 315 with a corresponding decode matrix coefficient stored in $\tilde{M}_{C\_comp}^{-1}$ for step 0, and the result can be accumulated in accumulators 903 (1 to 16), respectively, after assertion of signal LOAD_STEP. After the 2nd step, multipliers 901 (0 to M−1) multiply the digital representation of Qsig_tot$_C$ available at the output of integrator 811 with a decode matrix coefficient $\tilde{M}_{C\_comp}^{-1}$ for step 1 and the result can be accumulated in accumulators 903 (1 to 16), respectively, after assertion of signal LOAD_STEP. This process can be repeated until the data for the last step P have been processed, at which time the accumulated data in accumulators 1 to 16, which can now be representative of pixel data Csig$_C$, can be stored in the result register RAM 323 after assertion of signal LOAD_PIXEL. Note that signal LOAD_STEP also resets the first stage of the multi-stage vector demodulation engine 109 at the end of a given step in preparation for processing the composite data of the next step. The 2nd stage of the multi-stage vector demodulation engine essentially performs the operation in equation (9). Multipliers 901 (1-16) and accumulators 903 (1-16) need not be implemented as separate multipliers, but can be implemented with a single multiplier and accumulator that can be shared (i.e. time multiplexed) between multiple channels. An example of this is described in U.S. Patent Publication No. US2010/0060589, titled "ADVANCED RECEIVE CHANNEL ARCHITECTURE" by Thomas Wilson, the contents of which is incorporated herein by reference in entirety for all purposes.

Implementing a multi-stage vector demodulation such as the in the present example may provide a more flexible system than conventional designs. For example, the vector operation can allow for selection and testing of arbitrary vectors, allowing system designers to test and implement different stimulation matrix/decode matrix combinations, for example, without the need to extensive redesign of the sensing system. Likewise, use of a vector operation stage may allow the sensing system to use matrices that can be not easily invertible. For example, a Hadamard stimulation matrix containing 0 s, 1 s, and −1 s only (in order to stimulate with a single frequency of phase 0° or 180°) has an inverse that contains just 0 s, 1 s, and −1 s. However, the inverse of a circulant matrix, for example, contains fractional numbers. The current implementation, using matrix decode, allows the use of matrices such as a circulant matrix. In another potential benefit, scaling a system may be easier to accomplish. For example, in the case that the drivers on a chip are not uniform (e.g., in a case that the manufacturing process for the chip does not produce uniform drivers), the channels may be more easily scaled to reduce or correct the mismatch.

Referring to FIG. 3, an example optional feature according to examples of the disclosure will now be described. FIG. 3 illustrates that, in addition to receiving sense signals from sense channels 307, digital demod section 313 also can receive signals from other channels, such as miscellaneous channels 305 (see FIG. 3), which may include signals from e.g., sensor 111 (see FIG. 1). Sensor 111 can be, e.g., infrared sensors, temperature sensors, ambient light sensors, proximity sensors, etc. These miscellaneous channel signals may be used, for example, to calibrate the system, for example, during the demod/decode process, to display information, for additional sensing, for far field detection, etc. The miscellaneous channel signals may be demodulated and/or decoded similar to the sense signals, described above.

Figure 10:
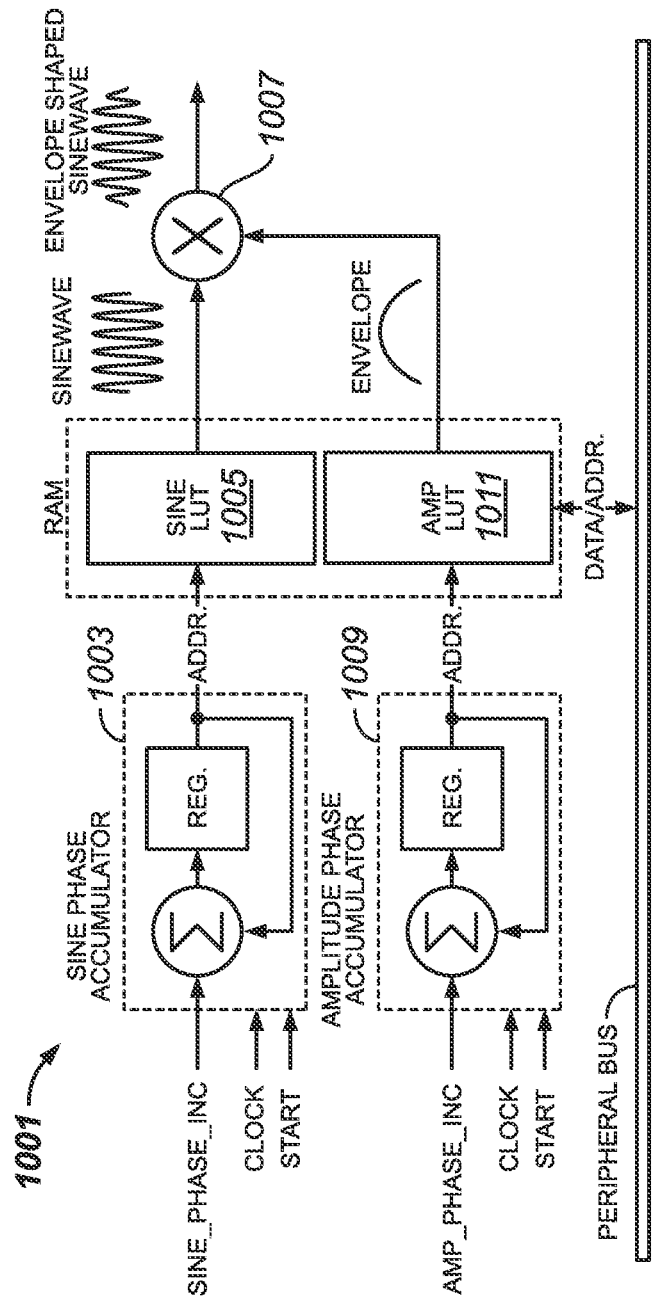
FIG. 10 illustrates an example receive NCO according to examples of the disclosure.

FIG. 10 illustrates an example receive NCO 1001 according to examples of the disclosure. The RX NCO can be comprised of a sine phase accumulator 1003, sine lookup table 1005, mixer 1007, amplitude phase accumulator 1009 and amplitude lookup table 1011. The programmable phase increment sine_phase_inc determines the frequency of the demodulation waveform. The phase accumulator 1003 accumulates the sine phase increment sine_phase_inc. The output of the sine phase accumulator 1003 represents an address into the sine lookup table 1005. The synthesized waveform out of the sine lookup table 1005 has a constant amplitude which then can be envelope shaped by multiplying it with the envelope. The envelope shape can be stored in an amplitude table 1011 and can be retrieved from the amplitude LUT at a rate set by the amplitude phase increment amp_phase_inc. Similarly to the sine phase increment, the amplitude phase increment amp_phase_inc can be accumulated by an amplitude phase accumulator 1009. The output of the amplitude phase accumulator 1009 represents an address into the amplitude RAM. For example, the sine lookup table 1005 may store 2048 coefficients, representing exactly one sine-wave cycle. The sine phase increment may be a 16 bit number, i.e. the phase accumulator 1009 can be also 16 bits. Since the sine lookup table 1005 stores 2048 coefficients, representing an address space of 11 bits, only the upper 11 bits out of the sine phase accumulator 1009 would be passed into the address port of the sine lookup table. Assuming that the demodulation waveform is generated at the ADC clock rate, FCLK_ADC, the phase increment for a given stimulus frequency FSTM may be phase_inc=2^16*FSTM/FCLK_ADC. One benefit of having envelope shaping can be that the spectral properties of the passband of the demodulation can be precisely controlled. The frequency response of the demodulation can be essentially the convolution of the time domain representation of the envelope and the sine wave out of the sine lookup table 1005. For example, for a rectangular window the frequency domain representation the demodulation would be a single frequency component convoluted with the time domain representation of the rectangular window (sinc function sin(x)/x). By using appropriate window functions such as Chebychev or Gaussian windows, the passband response can be optimized to fit a given application. The TX NCO may be constructed in a similar fashion and may or may not feature envelope shaping.

In addition to stimulating scanning touch sensor panel 124 to detect touch events, touch controller 106 can perform other functions. For example, controller 106 can perform a spectrum analyzer function prior to actively scanning panel 124 for touch detection. In a spectrum analyzer function, controller 106 drives panel 124 with drive signals of different frequencies in order to determine one or more frequencies that have the lowest noise. The low-noise frequency or frequencies can then be used to drive panel 124 during the active scanning phase. An example spectrum analyzer function is disclosed in U.S. Patent Publication No. US 2009/0009483, titled "SINGLE-CHIP TOUCH CONTROLLER WITH INTEGRATED DRIVE SYSTEM" by Christoph Horst Krah, Steve Porter Hotelling, Marduke Yousefpor and Tom Wilson, which is a Continuation-In-Part (CIP) application of U.S. Pat. No. 8,493,331, filed Jun. 13, 2007, the contents of both applications are incorporated herein by reference in entirety for all purposes.

Figure 11A:
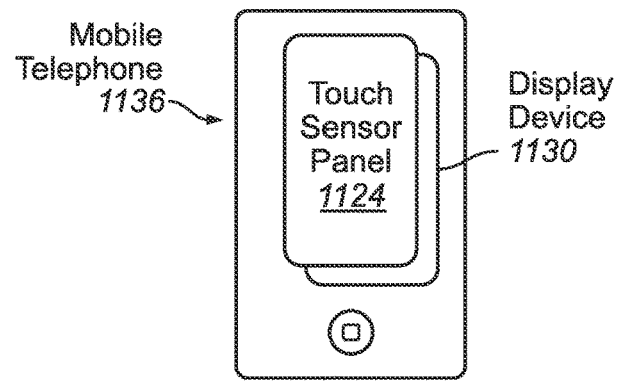
FIG. 11a illustrates an example mobile telephone having a touch sensor panel including a single-chip multi-stimulus controller according to examples of the disclosure.

FIG. 11*a* illustrates example mobile telephone 1136 that can include touch sensor panel 1124 and display device 1130, the touch sensor panel including a single-chip multi-stimulus controller with panel mismatch compensation according to examples of the disclosure.

Figure 11B:
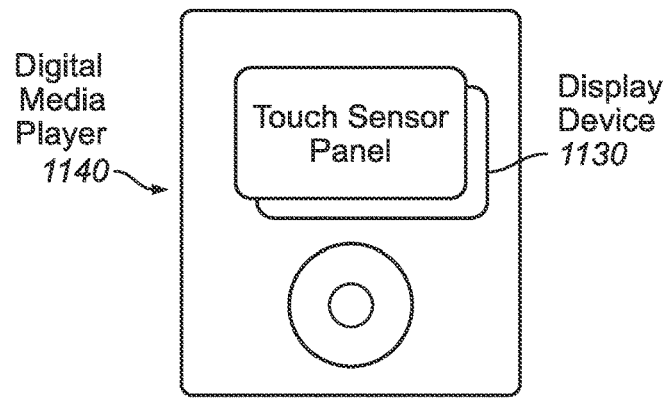
FIG. 11b illustrates an example digital media player having a touch sensor panel including a single-chip multi-stimulus controller according to examples of the disclosure.

FIG. 11*b* illustrates example digital media player 1140 that can include touch sensor panel 1124 and display device 1130, the touch sensor panel including a single-chip multi-stimulus controller with panel mismatch compensation according to examples of the disclosure.

Figure 11C:
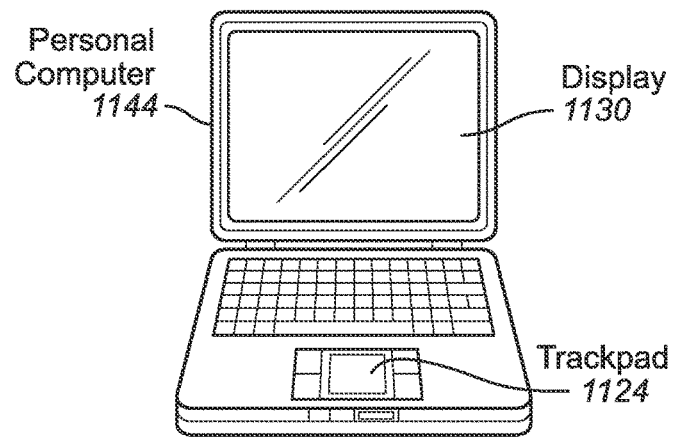
FIG. 11c illustrates an example personal computer having a touch sensor panel (trackpad) and/or display including a single-chip multi-stimulus controller according to examples of the disclosure.

FIG. 11*c* illustrates example personal computer 1144 that can include touch sensor panel (trackpad) 1124 and display 1130, the touch sensor panel including a single-chip multi-stimulus controller with panel mismatch compensation according to examples of the disclosure.

Therefore, according to the above, some examples of the disclosure are directed to a controller for a touch sensor panel. The controller can comprise a transmit section that generates a plurality of drive signals, a plurality of transmit channels that transmit the drive signals simultaneously to drive the touch sensor panel, and a plurality of adjustable gain buffers coupled to the transmit section. The adjustable gain buffers can be configurable to compensate the plurality of drive signals from the transmit section for differences in path lengths in the touch sensor panel. Additionally or alternatively to one or more examples disclosed above, the controller can further comprise one or more receive channels that receive sense signals resulting from the driving of the touch sensor panel and sense circuitry coupled to the one or more receive channels and configurable to detect changes in the sense signals on the one or more receive channels. The path lengths can include signal paths from the transmit channels to the receive channels. Additionally or alternatively to one or more examples disclosed above, the plurality of adjustable gain buffers can be coupled to a plurality of outputs of a digital-to-analog converter (DAC). Additionally or alternatively to one or more examples disclosed above, the plurality of adjustable gain buffers can comprise a first adjustable gain buffer and a second adjustable gain buffer. The first adjustable gain buffer can be coupled to a positive phase output of the DAC and the second adjustable gain buffer can be coupled to a negative phase output of the DAC. Additionally or alternatively to one or more examples disclosed above, at least one of the plurality of adjustable gain buffers can amplify at least one of the drive signals by an amplification factor. Additionally or alternatively to one or more examples disclosed above, the amplification factor for at least one of the plurality of adjustable gain buffers can be selected based on a scan step. Additionally or alternatively to one or more examples disclosed above, a plurality of amplification factors for the plurality of adjustable gain buffers can be stored in transmit logic. The transmit logic can be coupled to the plurality of adjustable gain buffers.

Other examples of the disclosure are directed to a method for generating stimulation signals for a touch sensor panel. The method can comprise: generating a plurality of drive signals; and compensating the plurality of drive signals using a plurality of adjustable gain buffers. Additionally or alternatively to one or more examples disclosed above, compensating the plurality of drive signals can comprise configuring one or more of the plurality of adjustable gain buffers to amplify one or more of the plurality of drive signals by an amplification factor. Additionally or alternatively to one or more examples disclosed above, compensating the plurality of drive signals can further comprise adjusting the amplification factor of one or more of the plurality of adjustable gain buffers based on a scan step. Additionally or alternatively to one or more examples disclosed above, compensating the plurality of drive signals can further comprise receiving an amplification factor at one or more of the adjustable gain buffers.

Other examples of the disclosure are directed to a method for generating a plurality of amplification factors for a plurality of adjustable gain buffers in a touch sensor panel. The method can comprise: generating a plurality of drive signals when no touch event occurs at the touch sensor panel; sensing at one or more receive channels a total charge at an input to one or more sense amplifiers coupled to the one or more receive channels; adjusting a gain of the plurality adjustable gain buffers; and selecting an amplification factor for one or more of the plurality of adjustable gain buffers corresponding to the gain resulting in the minimum total charge sensed on the one or more receive channels. Additionally or alternatively to one or more examples disclosed above, the method also comprises selecting an amplification factor for one or more of the plurality of adjustable gain buffers for a plurality of scan steps.

Other examples of the disclosure are directed to a non-transitory computer readable storage medium having stored thereon a set of instructions for generating a plurality of amplification factors for a plurality of adjustable gain buffers in a touch sensor panel, that when executed by a processor can causes the processor to generate a plurality of drive signals when no touch event occurs at the touch sensor panel, sense at one or more receive channels a total charge at an input to one or more sense amplifiers coupled to the one or more receive channels, adjust a gain of the plurality adjustable gain buffers, and select an amplification factor for one or more of the plurality of adjustable gain buffers corresponding to the gain resulting in the minimum total charge sensed on the one or more receive channels. Additionally or alternatively to one or more examples disclosed above, the processor can select an amplification factor for one or more of the plurality of adjustable gain buffers for a plurality of scan steps.

Other examples of the disclosure are directed to a non-transitory computer readable storage medium having stored thereon a set of instructions for generating a plurality of amplification factors for a plurality of adjustable gain buffers in a touch sensor panel, that when executed by a processor can cause the processor to: generate a plurality of drive signals and compensate the plurality of drive signals using a plurality of adjustable gain buffers. Additionally or alternatively to one or more examples disclosed above, the processor can configure one or more of the plurality of adjustable gain buffers to amplify one or more of the plurality of drive signals by an amplification factor. Additionally or alternatively to one or more examples disclosed above, the processor can adjust the amplification factor of one or more of the plurality of adjustable gain buffers based on a scan step. Additionally or alternatively to one or more examples disclosed above, the processor can supply an amplification factor at one or more of the adjustable gain buffers.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A controller for a touch sensor panel, the controller comprising:
   transmit circuitry configured to generates a plurality of drive signals;
   a plurality of transmit channels configured to transmit the plurality of drive signals simultaneously to drive the touch sensor panel; and
   a plurality of adjustable gain buffers coupled to the transmit circuitry, wherein the plurality of adjustable gain buffers are directly connected to a plurality of outputs of at least one digital-to-analog converter (DAC), wherein gain of one or more of the plurality of adjustable gain buffers is adjustable to adjust an amplitude of one or more of the plurality of drive signals, thereby compensating the plurality of drive signals from the transmit circuitry for differences in path lengths in the touch sensor panel.

2. The controller of claim 1, further comprising:
   one or more receive channels configured to receive sense signals resulting from the driving of the touch sensor panel; and
   sense circuitry coupled to the one or more receive channels and configurable to detect changes in the sense signals on the one or more receive channels;
   wherein the path lengths include signal paths from the plurality of transmit channels to the one or more receive channels.

3. The controller of claim 1, wherein at least one of the plurality of adjustable gain buffers amplifies at least one of the plurality of drive signals by at least one amplification factor, and wherein a magnitude of the at least one amplification factor for the at least one of the plurality of adjustable gain buffers is different from a magnitude of another amplification factor for at least another of the plurality of adjustable gain buffers.

4. The controller of claim 1, wherein the plurality of adjustable gain buffers comprises a first adjustable gain buffer and a second adjustable gain buffer, the first adjustable gain buffer directly connected to a positive phase output of the at least one DAC and the second adjustable gain buffer directly connected to a negative phase output of the at least one DAC.

5. The controller of claim 1, wherein at least one of the plurality of adjustable gain buffers amplifies at least one of the plurality of drive signals by at least one amplification factor, and
   wherein the at least one amplification factor for the at least one of the plurality of adjustable gain buffers is selected based on a scan step, each scan step associated with compensation gains for a given phase configuration.

6. The controller of claim 5, wherein a plurality of amplification factors for the plurality of adjustable gain buffers is stored in transmit logic, the transmit logic coupled to the plurality of adjustable gain buffers.

7. A controller for a touch sensor panel, the controller comprising:
   transmit circuitry configured to generates a plurality of drive signals;
   a plurality of transmit channels that transmit the plurality of drive signals simultaneously to drive the touch sensor panel; and
   a plurality of adjustable gain buffers coupled to the transmit circuitry, wherein gain of one or more of the plurality of adjustable gain buffers is adjustable to adjust an amplitude of one or more of the plurality of drive signals, thereby compensating the plurality of drive signals from the transmit circuitry for differences in path lengths in the touch sensor panel,
   wherein at least one of the plurality of adjustable gain buffers amplifies at least one of the plurality of drive signals by at least one amplification factor, and wherein a magnitude of the at least one amplification factor for the at least one of the plurality of adjustable gain buffers is different from a magnitude of another amplification factor for at least another of the plurality of adjustable gain buffers.

8. The controller of claim 7, further comprising:
   one or more receive channels configured to receive sense signals resulting from the driving of the touch sensor panel; and
   sense circuitry coupled to the one or more receive channels and configurable to detect changes in the sense signals on the one or more receive channels;
   wherein the path lengths include signal paths from the plurality of transmit channels to the one or more receive channels.

9. The controller of claim 7, wherein the plurality of adjustable gain buffers are directly connected to a plurality of outputs of at least one digital-to-analog converter (DAC).

10. The controller of claim 9, wherein the plurality of adjustable gain buffers comprises a first adjustable gain buffer and a second adjustable gain buffer, the first adjustable gain buffer directly connected to a positive phase output of the at least one DAC and the second adjustable gain buffer directly connected to a negative phase output of the at least one DAC.

11. The controller of claim 7, wherein the at least one amplification factor for the at least one of the plurality of adjustable gain buffers is selected based on a scan step, each scan step associated with compensation gains for a given phase configuration.

12. The controller of claim 11, wherein a plurality of amplification factors for the plurality of adjustable gain buffers is stored in transmit logic, the transmit logic coupled to the plurality of adjustable gain buffers.

13. A method for generating stimulation signals for a touch sensor panel, the method comprising:
generating a plurality of drive signals; and
compensating the plurality of drive signals using a plurality of adjustable gain buffers, wherein gain of one or more of the plurality of adjustable gain buffers is adjustable to adjust an amplitude of one or more of the plurality of drive signals, wherein compensating the plurality of drive signals comprises configuring at least one of the plurality of adjustable gain buffers to amplify at least one of the plurality of drive signals by at least one amplification factor, wherein a magnitude of the at least one amplification factor for the at least one of the plurality of adjustable gain buffers is different from a magnitude of another amplification factor for at least another of the plurality of adjustable gain buffers.

14. The method of claim 13, wherein compensating the plurality of drive signals comprises:
adjusting the at least one amplification factor for the at least one of the plurality of adjustable gain buffers based on a scan step, each scan step associated with compensation gains for a given phase configuration.

15. The method of claim 14, wherein compensating the plurality of drive signals further comprises:
receiving the at least one amplification factor at the at least one of the adjustable gain buffers.

16. A method for generating a plurality of amplification factors for a plurality of adjustable gain buffers in a touch sensor panel, the method comprising:
generating a plurality of drive signals when no touch event occurs at the touch sensor panel;
sensing at one or more receive channels a total charge at an input to one or more sense amplifiers coupled to the one or more receive channels; and
selecting an amplification factor for gain of at least one of the plurality of adjustable gain buffers, wherein:
the gain is adjustable to adjust an amplitude of at least one of the plurality of drive signals,
the amplification factor corresponds to the gain resulting in a minimum total charge sensed on the one or more receive channels, and
the amplification factor for the at least one of the plurality of adjustable gain buffers is different from another amplification factor for at least another of the plurality of adjustable gain buffers.

17. The method of claim 16, wherein:
selecting the amplification factor comprises selecting one or more amplification factors for one or more gains of one or more of the plurality of adjustable gain buffers for a plurality of scan steps, each scan step associated with compensation gains for a given phase configuration.

18. A non-transitory computer readable storage medium having stored thereon a set of instructions for generating a plurality of amplification factors for a plurality of adjustable gain buffers in a touch sensor panel, that when executed by a processor causes the processor to:
generate a plurality of drive signals when no touch event occurs at the touch sensor panel;
sense at one or more receive channels a total charge at an input to one or more sense amplifiers coupled to the one or more receive channels; and
select an amplification factor for gain of at least one of the plurality of adjustable gain buffers, wherein:
the gain is adjustable to adjust an amplitude of at least one of the plurality of drive signals,
the amplification factor corresponds to the gain resulting in a minimum total charge sensed on the one or more receive channels, and
the amplification factor for the at least one of the plurality of adjustable gain buffers is different from another amplification factor for at least another of the plurality of adjustable gain buffers.

19. The non-transitory computer readable storage medium of claim 18, wherein the processor selects one or more amplification factors for one or more gains of one or more of the plurality of adjustable gain buffers for a plurality of scan steps, each scan step associated with compensation gains for a given phase configuration.

20. A non-transitory computer readable storage medium having stored thereon a set of instructions for generating stimulation signals for a touch sensor panel, that when executed by a processor causes the processor to:
generate a plurality of drive signals; and
compensate the plurality of drive signals using a plurality of adjustable gain buffers, wherein gain of one or more of the plurality of adjustable gain buffers is adjustable to adjust an amplitude of one or more of plurality of drive signals;
wherein the processor configures at least one of the plurality of adjustable gain buffers to amplify at least one of the plurality of drive signals by at least one amplification factor, wherein a magnitude of the at least one amplification factor for the at least one of the plurality of adjustable gain buffers is different from a magnitude of another amplification factor for at least another of the plurality of adjustable gain buffers.

21. The non-transitory computer readable storage medium of claim 20, wherein the processor adjusts the at least one amplification factor for the at least one of the plurality of adjustable gain buffers based on a scan step, each scan step associated with compensation gains for a given phase configuration.

22. The non-transitory computer readable storage medium of claim 21, wherein the processor supplies the at least one amplification factor to the at least one of the adjustable gain buffers.

* * * * *